United States Patent [19]
Nakano et al.

[11] Patent Number: 5,714,280
[45] Date of Patent: Feb. 3, 1998

[54] LITHIUM SECONDARY BATTERY

[75] Inventors: Kenji Nakano; Masahiro Yamamoto, both of Iwaki, Japan

[73] Assignee: Furukawa Denchi Kabushiki Kaisha, Yokohama, Japan

[21] Appl. No.: 551,138

[22] Filed: Oct. 31, 1995

[30] Foreign Application Priority Data

| Nov. 9, 1994 | [JP] | Japan | 6-312305 |
| Nov. 9, 1994 | [JP] | Japan | 6-312306 |
| Nov. 9, 1994 | [JP] | Japan | 6-313929 |
| Nov. 10, 1994 | [JP] | Japan | 6-313930 |
| Dec. 14, 1994 | [JP] | Japan | 6-338286 |
| Dec. 14, 1994 | [JP] | Japan | 6-338287 |
| Dec. 22, 1994 | [JP] | Japan | 6-340814 |
| Dec. 22, 1994 | [JP] | Japan | 6-340815 |

[51] Int. Cl.$^6$ .................................. H01M 10/40
[52] U.S. Cl. ............... 429/197; 429/198; 429/199
[58] Field of Search ...................... 429/194, 197, 429/198, 199

[56] References Cited

U.S. PATENT DOCUMENTS

| 5,352,548 | 10/1994 | Fujimoto et al. | 429/194 |
| 5,478,674 | 12/1995 | Miyasaka | 429/218 |
| 5,529,859 | 6/1996 | Shu et al. | 429/199 |

FOREIGN PATENT DOCUMENTS

| 0 531 617 A1 | 3/1993 | European Pat. Off. |
| 0 599 534 A1 | 6/1994 | European Pat. Off. |
| 62-290071 | 12/1987 | Japan . |
| 64-14879 | 1/1989 | Japan . |
| 4-162370 | 6/1992 | Japan . |

OTHER PUBLICATIONS

JP-A-62 290071 -Abstract- Matsushita Electric Ind Co Ltd. Dec. 16, 1987, vol. 012 No. 187 (E-615), May 31, 1988.

JP-A-62 290072 -Abstract- Matsushita Electric Ind Co Ltd. Dec. 16, 1987, vol. 012 No. 187 (E-615), May 31, 1988.

Masoka et al., Fluorine Containing Cyclic Carbonates, Patent Abstracts of Japan, Kokai patent application 63-68583, vol. 12, No. 299, C520, Aug. 15, 1988.

Yokoyama et al., "Novel Carbonate Compounds, No-Aqueous Electrolytic Solutions and Batteries", European Patent Application 0 599534, Jun. 1, 1991.

Primary Examiner—Stephen Kalafut
Assistant Examiner—Carol Chaney
Attorney, Agent, or Firm—Armstrong, Westerman, Hattori, McLeland & Naughton

[57] ABSTRACT

A lithium secondary battery comprising a positive electrode, a negative electrode and an organic electrolyte, and the electrolyte comprises a solvent mixture of at least one kind of fluorine substituted propylene carbonates used as a first solvent and at least one kind of low viscous solvents for lowering the viscosity of fluorine substituted propylene carbonates, used as a second solvent. At least one solvent selected from a group of dimethyl carbonate, methyl ethyl carbonate, diethyl carbonate, methyl propyl carbonate and methyl butyl carbonate is preferably used as the second solvent. There can be obtained resultant electrolytes which are excellent in self-extinguishing ability, resulting in high safety and easy in handling, and also excellent in battery performance, discharge characteristics at a low temperature, charge/discharge efficiency of the negative electrode at the initial stage of charge/discharge cycles, energy density, and suppression of the deterioration of the characteristics of the positive electrode, made of one kind of lithium containing complex oxides, during recharging cycles at a deep or large charging depth. When 4-trifluoromethyl-ethylene carbonate is used, the above-mentioned characteristics can be much more improved.

10 Claims, 2 Drawing Sheets

LITHIUM SECONDARY BATTERY

FIELD OF THE INVENTION

This invention relates to a lithium secondary battery.

BACKGROUND OF THE INVENTION

Recent rapid growth of electronic industry has inspired a great demand for high performance, compact and portable electronic devices. Thus these electronic devices have required rechargeable secondary batteries with high energy density. As the secondary batteries to be used for these electronic devices, there are lead acid batteries, nickel-cadmium batteries, nickel-hydrogen batteries. However, these batteries do not meet the above requirements due to their lower discharge voltage resulting in lower energy density.

Recently, as a higher energy density battery, lithium secondary batteries have been on stage and some of them are already commercialized. The lithium secondary battery comprises a negative electrode with metallic lithium, lithium alloy or carbon materials capable of electro-chemically occluding and releasing lithium ions and a positive electrode. These batteries have, comparing to other conventional batteries, higher energy density per unit volume or unit weight. Therefore it is said that they are the most promising secondary batteries today.

More specifically, this kind of battery comprises a negative electrode made of at least one kind of active materials selected from a group of metallic lithium, lithium alloy and carbon materials electron-chemically capable of occluding and releasing lithium ions, a positive electrode made of at least one kind of materials capable of occluding lithium ions and an organic electrolyte in which lithium salt is dissolved in an organic solvent. Unlike conventional batteries made of such as lead acid, nickel-cadmium and nickel-hydrogen storage batteries wherein aqueous solutions are used, a lithium secondary battery using combustible organic solvents as an electrolyte is high in combustibility. For this reason, an improvement in safety prevention is highly required. Focusing on this, there has been developed a non-aqueous electrolyte type battery bringing about lowering the combustibility of organic solvents, an improvement of the stability and improvement of battery performance.

For example, there has been known a non-aqueous electrolyte which comprises a solvent mixture wherein at least one kind of specific ether compounds such as dimethoxyethane and silfolane and a solute such as $LiPF_6$ or LiBF. (Japanese Laid Open Patent Publication No. 1989-14879).

Also, in organic electrolyte type secondary batteries consisting of negative electrode, positive electrode and organic electrolyte, there has been known from Japanese Laid Open Patent Publication 1987-290071 disclosing in stead of propylene carbonate or 2-methyl tetrahydrofuran conventionally used as a solvent for an organic electrolyte, propylene carbonate alone of which hydrogen(s) positioned at 3 to 4 is/are substituted with chlorine or fluorine is used and thereby to improve current efficiency of the negative electrode at the time of charge and discharge and the battery cycle characteristics. On the other hand, this kind of secondary battery has previously been developed by using metallic lithium or lithium alloy as an negative electrode. But the troubles such as less efficiency at the time of charge and discharge, pulverization or formation of unfavorable dendrites were occurred, Consequently they have hardly been commercialized. Recently, however, there has been product that carbon materials capable of electro-chemically occluding and releasing lithium ion is used as an negative electrode material. The negative electrode using such materials can provide a lithium secondary battery having excellent charge-discharge reversibility because its high average charge-discharge efficiency as a whole of cycle is high as compared with the negative electrode using metallic lithium or lithium alloy. This is superior to metallic lithium or metal alloy based negative electrodes.

No sediment of metallic lithium is observed in the batteries when this kind of materials is used as an negative electrode, so that lithium secondary batteries with high safety can be provided, and as a result, the commercialization thereof has recently been achieved with the combination of lithium-containing complex oxides as a positive electrolyte. In the lithium secondary battery wherein carbon materials capable of occluding and releasing lithium ions electrochemically, there has been known such an improved one that the lower temperature characteristics can be improved by using a mixture of chain carbonates such as dimethyl carbonate, diethyl carbonate, etc. and cyclic carbonates are solvents for non-aqueous electrolytes. (Japanese Laid Open Patent Publication No. 1992-162370).

However, it has been found that the invention disclosed in the above-described Japanese Laid Open Patent Publication No. 1987-290071 has a drawback with the lack of solvent stability during repetition of charge and discharge, resulting in poor in the battery performance.

In the invention disclosed in Japanese Laid Open Patent Publication 1987-290071, chlorine or fluorine substituted propylene carbonate is used alone as a solvent for an organic electrolyte, so that it increases the viscosity, resulting in a significant increase in internal resistance.

As to the lithium secondary batteries using as an active material for a negative electrode made of carbon materials capable of occluding and releasing lithium ions is highly expected as a negative electrode of a secondary battery having a high performance, makes the cycle life much longer than the lithium secondary batteries using metallic lithium or lithium alloy as a negative electrode, and the possibility of short circuit due to the lithium dendrite formation is much lower.

Although the charge-discharge efficiency of the negative electrode carbon materials is more than 95% in average, which is much higher than that of the negative electrode using metallic lithium or its alloy, such a high valid can not be obtained at the initial stage of the charge and discharge cycles. Such a low charge-discharge efficiency of the negative electrolyte at the initial stage of the charge/discharge cycles not only causes the lowering of the capacity with the progress of the cycles of this kind of the lithium battery, but also, when the negative electrode capacity becomes lower than that of the positive electrode capacity, electrically active metallic lithium deposits on the surfaces of the active material of the negative electrode at the time of charging, the safety of the lithium secondary battery is much lower. Therefore, in order to prevent the lowering to the cycle life and the safety. To avoid such a capacity loss of the carbon material at the initial stage, such a preventing measure has been taken that some amount of carbon material that would be lost at the initial stage is added to the battery when it is manufactured. But such a measure naturally sacrifices the original energy density of the battery. This tendency becomes remarkable accordingly as the crystallization degree of carbon material are increased.

In this respect, such drawbacks have been removed by the invention disclosed in Japanese Laid Open Patent Publication No. 1992-162379 which uses carbon materials as an negative electrode. However, since the organic solvent is the mixture of solvents as mentioned above, combustibility thereof is high and the safety problem remains.

For the purpose of improving the charge-discharge efficiency of the negative electrode using carbon materials, it has been proposed that ethylene carbonate is used instead of propylene carbonate because it has as a higher dielectric constant.

However, this proposal is not considered to be practical from the industrial point of view because ethylene carbonate is such high in melting point of 36.4° C. that is solid in room temperature, resulting in making difficult in handling.

There have been also proposed such an organic electrolyte used for lithium secondary batteries that contains a lithium salt such as $LiPF_6$ or the like dissolved in a non-aqueous solvent chiefly consisting of a mixture of a cyclic ester with a high dielectric constant such as propylene carbonate and a low viscous solvent such as diethyl carbonate. This type of battery has been appeared before the footlights recently because this type of battery uses $LiCoO_2$ which is a lithium containing complex oxide having a structure of $\alpha$-$NaCrO_2$ as an active material for a positive electrolyte. This active material, oxidation-reduction reactions takes place at a high electric potential, and thereby about 3.7 of discharge voltage can be obtained on average. This kind of active materials has multi-layer structure comprises such an alternative order of oxygen layer as an oxygen layer—a lithium layer—an oxygen layer—a cobalt layer—an oxygen layer—a lithium layer—. This multi-layers structure means that when the charge depth is deep or large and, in other words, when too much lithium ions are taken out from the lithium compound, the lithium layers in the lithium compound disappear, and as a result, the oxygen layers on both sides of the lithium layer are electrically repelled from each other, and cause the destruction of the crystal structure, resulting in rapid deterioration of the battery performance.

For this reason, in the conventionally available lithium secondary battery of this kind is used in such a manner that the charging voltage is limited to 4.3 volt or less than that so as to prevent the positive electrolyte active material from deterioration.

Thus, in view the above-mentioned lithium secondary batteries, there are still strong desire for improvement in the safety, performance of the lithium secondary batteries, the charge-discharge of the active material for the positive electrode, etc.

SUMMARY OF THE INVENTION

The object of this invention is to solve the above mentioned problems, and to provide a lithium secondary battery which has a higher performance and, safety, and which is excellent incombustibility and self-extinguishing characteristics.

The object of this invention is to provide a lithium secondary battery which is excellent particularly in discharge characteristics thereof, incombustibility and self extinguishing ability.

To achieve this object, this invention is characterized in that the first solvent comprises at least 4-trifluoromethyl-ethylene carbonate and the second solvent comprises at least dimethyl carbonate and the volume percentage of the first solvent is 35 to 55% of the total volume of the whole solvents solvent is 45 to 55% of the total volume thereof, and the volume of 4-trifluoromethyl ethylene carbonate is 35%–55% of the total volume of the whole solvents and the volume of dimethyl carbonate accounts for 40 to 100% of the total volume of the secondary solvent(s).

Another object of this invention is to remove the conventional problems and provide a lithium secondary battery with high safety and particularly excellent discharge characteristics at a low temperature.

To achieve this object, this invention is characterized in that a solvent mixture of at least 4-trifluoromethyl-ethylene carbonate using as the first solvent and the second solvent prepared by adding at least one kind selected from the group of consisting of diethyl carbonate and methyl ethyl carbonate to dimethyl carbonate, and the first and second solvents are mixed.

More particularly, according to this invention, in the lithium secondary battery, wherein the organic electrolyte comprises a solute comprising at least one kind of lithium salts dissolved in an organic solvent mixture of the first solvent comprising at least one kind of cyclic esters and the second solvent comprising at least one kind of chain esters and the first solvent has at least 4-trifluoromethyl-ethylene carbonate and the second solvent has at least dimethyl carbonate, it is characterized in that the second solvent has at least a mixture of the solvents wherein dimethyl carbonate is mixed with at least one selected from the group consisting of diethyl carbonate and methyl ethyl carbonate, and the volume percentage of the first solvent is 35 to 55% of the total volume of the whole solvents and the volume of second solvent is 45 to 55% of the total volume thereof, and the volume of 4-trifluoromethyl-ethylene carbonate used as the first solvent is 35 to 55% of the total volume of the whole solvents and the volume of dimethyl carbonate is 40 to 80% of the total volume of the second solvents, and the volume of at least one selected from the group of diethyl carbonate and methyl ethyl carbonate is 20 to 60% of the total volume of the whole secondary solvents.

A further another object of this invention is, in the lithium secondary battery wherein a negative electrode is made of carbon materials capable of electro-chemically occluding and releasing lithium ions is used as an active material for the negative electrode, to provide a lithium secondary battery which is improved in charge/discharge characteristics of the negative electrode at the initial stage of charge/discharge cycles and has a large energy density as compared with this kind of batteries using the conventional electrolytes, and is easy in handling of the organic electrolyte solvents, and also is improved especially in charge and discharge efficiency.

To achieve this object, this invention is characterized in that a solvent for an organic electrolyte comprises at least 4-trifluoromethyl ethylene carbonate as the first solvent and the second solvent comprising at least one kind of solvents for lowering the viscosity of 4-trifluoromethyl-ethylene carbonate. In this case, it is preferable to use a solvent mixture comprising the first solvent which is 4-trifluoromethyl ethylene carbonate and the second solvent which comprises at least one kind selected from the group of dimethyl carbonate, methyl ethyl carbonate, diethyl carbonate, methyl propyl carbonate and methyl butyl carbonate.

It is also preferable to use a solvent mixture wherein the volume of the above mentioned first solvent is 30% or more of the total volume of the whole solvents, and the volume of the second solvent accounts for 40% or more of the total volume of the whole solvents, and the total volume of the first and secondary solvents accounts for more than 80% or more of the total volume of the whole solvents.

A further another object of this invention is, in the lithium secondary battery wherein at least one kind selected from the group of lithium containing complex oxides having a structure of α-NaCrO₂ as an active material for a negative electrode material is used, to provide a lithium secondary battery, which depresses the deterioration of the negative active material which Comprises the lithium containing complex oxides with the structure of α-NaCrO₂ at a large or deep charge depth, resulting in providing a large energy density as compared with this kind of batteries using the conventional electrolytes.

A further another object of this invention is, in the lithium secondary battery wherein at least one kind selected from the group of lithium containing complex oxides having a structure of α-NaCrO₂ is used as an active material for a positive electrode to provide a lithium secondary with large energy density, particularly with excellent discharge characteristics of the active material for the positive electrode and to depresses the deterioration of the characteristics of the active material having α-NaCrO₂ structure for the positive electrode at the large depth of charge as compared with this kind of lithium secondary batteries using the conventional electrolytes.

To achieve this object, this invention is characterized in that a solvent for an organic electrolyte is a solvent mixture comprising 4-trifluoromethyl-ethylene carbonate used as the first solvent and at least one kind of solvents for lowering the viscosity of 4-trifluoromethyl-ethylene carbonate, as the second solvent.

In this case, it is preferable to use the solvent mixture comprising 4-trifluoromethyl-ethylene carbonate and at least one kind selected from the group of dimethyl carbonate, methyl ethyl carbonate, diethyl carbonate, methyl propyl carbonate and methyl butyl carbonate as the second solvent.

It is also preferable to use a solvent mixture wherein the volume percentage of the first solvent is 30% or more of the total volume of the whole solvents, and the volume of the second solvent is 40% or more of the total volume thereof, and the total volume of the first and second solvents is 80% or more of the total volume of the whole solvents. The embodying examples of the above mentioned inventions will now be described in detail as follows:

DESCRIPTION OF THE PREFERRED EMBODIMENTS

EMBODIMENT 1

Figure 1:
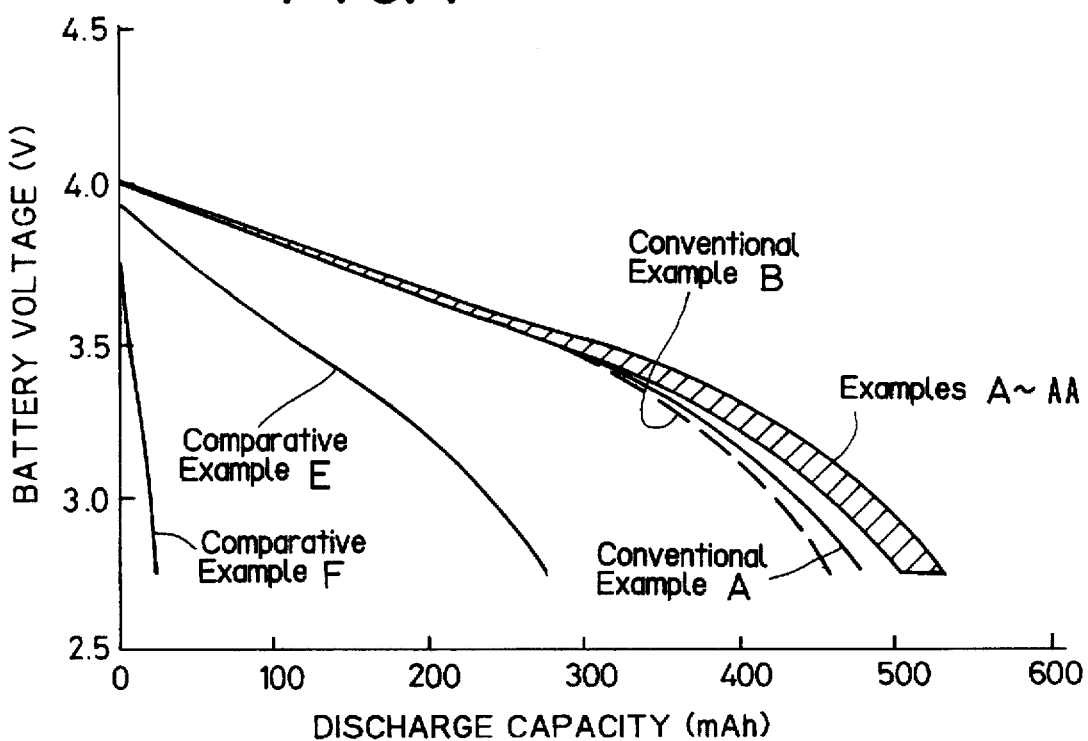
FIG. 1 is a diagram showing charge/discharge characteristics at the 10th cycle for examples A to AA, conventional examples A and B and comparative examples E and F in EXAMPLE 3 according to this invention.

A preferred EMBODIMENT of this invention will be explained below for providing an excellent lithium secondary battery which is provided with not only high self extinguishing ability and high safety, but also an especially excellent discharge characteristics.

Such a battery with the above-mentioned various characteristics can be obtained by using a solvent mixture prepared by mixing the first solvent comprising at least one kind of cyclic esters, wherein the second solvent comprises at least one kind of chain esters, and the first solvent comprising at least 4-trifluoromethyl-ethylene carbonate, and dimethyl carbonate is used at least as the second solvent.

4-trifluoromethyl-ethylene carbonate has the following structural formula:

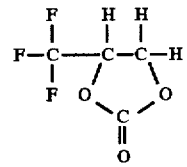

For the primary solvent, at least one kind if other cyclic esters, for example, at least one kind of cyclic esters selected from the group of propylene carbonate, ethylene carbonate, butylene carbonate, γ-butylolactone, vinylene carbonate, 2-methyl-γ-butyl-lactate, acetyl-γ-butyl-lactate, γ-valero lactone, etc. can be mixed with 4-trifluoromethyl ethylene carbonate.

For the other chain esters to be used as the second solvent, at least one kind of chain esters selected from the group of methyl ethyl carbonate, propyl methyl carbonate, methyl butyl carbonate, diethyl carbonate, propyl ethyl carbonate, ethyl butyl carbonate, dipropyl carbonate, propyl butyl carbonate, dibutyl carbonate, alkyl propionates, dialkyl malonate, alkyl acetate etc. can be mixed with dimethyl carbonate.

As will be clear below, the volume of the first solvent should be in the range of 35 to 55% of the total volume of the whole solvents for an electrolyte and that of the second solvent should be in the range of 45 to 65% thereof, and the volume of 4-trifluoromethyl-ethylene carbonate should be in the range of 35% –55% thereof and the volume of dimethyl carbonate should be in range of 40–100% of the total volume of the second solvent(s).

For lithium salts to be used for the solute in organic electrolytes are not necessarily limited, as long as they are capable of dissociating in the organic solvent to supply lithium ions, they can be used. As to lithium salts to be used for the solute for an organic electrolyte, any kind which is capable of dissociating in an organic solvent and releasing lithium ions can be used. For examples, there can be used such inorganic lithium salts as LiClO₄, LiBF₄, LiPF₆, LiAsF₆, LiCl, LiBr etc. and such organic lithium salts as Li(C₆H₅), LiN(SO₂CF₃)₂, LiC(S)₂CF₃)₃, LiOSO₂CF₃, LiOSO₂C₂F₅, LiOSO₂C₃F₇, LIOSO₂C₄F₉, LiOSO₂C₅F₁₁, LiOSO₂C₆F₁₃, LiOSO₂C₇F₁₅ is can be used. Among the above lithium salts, fluorine-containing lithium salts are preferable in terms of safety. More preferably, LiPF₆ alone or a mixture mainly composed of LiPF₆ mixed with any other lithium salt(s) are preferable, because LiPF₆ is recommendable due to its high in electro-conductivity. Among them, it is preferable to use fluorine containing lithium slats in terms of safety. Especially, the use of LiPF₆ alone or the mixture thereof with any other lithium containing compound wherein LiPF₆ contains in majority gives favorable results because it has especially high electro-conductivity.

As to the active materials for the positive electrode to be used there can be used any kind which is capable of electro-chemically occluding and releasing lithium ions. For instance, such lithium-containing complex oxides as $LiCoO_2$, $LiNiO_2$, $LiMnO_2$, $LiMn_2O_4$ or such chalcogen compounds as $TiO_2$, $MnO_2$, $MoO_3$, $V_2O_5$, $TiS_2$, $MoS_2$ etc can be used. Among them, such a lithium compound having a structure of $\alpha$-$NaCrO_2$ such as $LiCoO_2$, $LiNiO_2$,$LiMnO_2$, or $LiMn_2O_4$ or the like is preferable, because it is high in discharge voltage and electro-chemical stability. As mentioned above, particularly, lithium compounds having a structure of $\alpha$-$NaCrO_2$ such as $LiCoO_2$, or $LiNiO_2$, or $LiMn_2O_4$ or the like are preferable because they bring about high charge voltage and electro-chemical stability.

As to the active materials for a negative electrode, there can be used at least one kind of materials selected from the group of metallic lithium, lithium alloy and carbon materials which are capable of electro-chemically occluding and releasing lithium ions.

When 4-trifluoromethyl-ethylene carbonate alone is used for a solvent for electrolyte used in a lithium secondary battery, the viscosity of the electrolyte becomes so high that a desired battery capacity can not be obtained when the charge/discharge operation is carried out with a relatively large current, though it is possible to carry out the charge/discharge operation with a very small current. It is therefore necessary to adjust the viscosity thereof by mixing to a solvent for lowering the viscosity thereof.

According to this invention, in this case, various kinds of chain esters as the second solvent were added thereto for investigating the self distinguishing ability of the resultant solvent mixtures. As a result, it has been found that only when dimethyl carbonate is added thereto, the resultant solvent mixture exhibits an excellent self distinguishing ability, though the mechanism bringing this effect is not clear.

When dimethyl carbonate was added to any kind of fluorine substituted propylene carbonates, the resultant solvent mixtures the self extinguishing ability was obtained with all of the resultant solvent mixtures.

In this case, it has been found that when 4-trifluoromethyl-ethylene carbonate was added thereto, the resultant solvent mixture exhibited especially excellent self extinguishing ability. The reason is considered as follows. 4-trifluoromethyl-ethylene carbonate is such that when the hydrogens of the methyl group of propylene carbonate are all substituted with fluorine, the electron donating group as seen in the methyl group was changed to the electron attractive group substituted with fluorines so that 4-trifluoromethyl-ethylene carbonate is high in electrochemical stability, and the decomposition can be prevented during charging and discharging to bring about more excellent battery performance, as compared with propylene carbonate having the methyl group.

As a result of repeated various tests to determine the optimum ratio of the solvent mixture it has been found that the volume of 4-trifluoromethyl-ethylene carbonate to be used as the first solvent should be in the range of 35–55% of the total volume of the whole solvents, and if the volume thereof accounts for less than vol 35%, it makes it to sufficiently dissociates lithium salt, and increase the internal resistance, and as a result, it becomes difficult to take out a sufficient capacity. If the volume thereof is more than 55 vol %, the viscosity is increased, so that the mobility of lithium irons is lowered and the internal resistance is increased.

On the other hand, second solvent is necessary for lowering the viscosity of the foregoing first solvent and increasing the electro-conductivity thereof. The percentage of the secondary solvent of the total volume of the whole solvents should be in the range of 45–65% If its volume is less than 35%, sufficient effect of lowering the viscosity can not be obtained. If its volume is more than 65%, it results in the less volume of the first solvent which causes lowering in the dissociation degree of lithium salt and increases in the internal resistance.

The volume of dimethyl carbonate in the total volume of the whole second solvent(s) should be in the range of 40–100% of the total volume of the whole secondary solvent(s). If its volume in the secondary solvent is less than 40%, a sufficient self extinguishing ability can not be obtained.

TEST EXAMPLE 1

The following tests were carried out to ascertain the self extinguishing ability of electrolytes to be used for this invention battery.

Among the lithium salts, $LiPF_6$ was used as a solute, and the electrolytes were prepared by dissolving it in various solvent mixtures as listed in Table 1 and 2 and adjusting the solute concentration to become 1 mol/l.

The mixing ratio is shown by volume.

TABLE 1

|  | Lithium salt |  | Kind of solvent mixture |  |  |
| --- | --- | --- | --- | --- | --- |
|  | Kind of lithium salt | Concentration mol/L | First solvent | Second solvent | Mixing ratio (by volume) |
| Example A | $LiPF_6$ | 1.0 | 4TFMEC | DMC | 35:65 |
| Example B | $LiPF_6$ | 1.0 | 4TFMEC | DMC | 45:55 |
| Example C | $LiPF_6$ | 1.0 | 4TFMEC | DMC | 50:50 |
| Example D | $LiPF_6$ | 1.0 | 4TFMEC | DMC | 55:45 |
| Example E | $LiPF_6$ | 1.0 | 4TFMEC | DMC + MPC | 35:45:20 |
| Example F | $LiPF_6$ | 1.0 | 4TFMEC | DMC + MPC | 35:26:39 |
| Example G | $LiPF_6$ | 1.0 | 4TFMEC | DMC + MPC | 45:40:15 |
| Example H | $LiPF_6$ | 1.0 | 4TFMEC | DMC + MPC | 45:22:33 |
| Example I | $LiPF_6$ | 1.0 | 4TFMEC | DMC + MPC | 55:35:10 |
| Example J | $LiPF_6$ | 1.0 | 4TFMEC | DMC + MPC | 55:18:27 |
| Example K | $LiPF_6$ | 1.0 | 4TFMEC | DMC + MEC | 35:45:20 |
| Example L | $LiPF_6$ | 1.0 | 4TFMEC | DMC + MEC | 45:40:15 |
| Example M | $LiPF_6$ | 1.0 | 4TFMEC | DMC + MBC | 55:35:10 |
| Example N | $LiPF_6$ | 1.0 | 4TFMEC | DMC + MPC + MBC | 35:45:10:10 |
| Example O | $LiPF_6$ | 1.0 | 4TFMEC | DMC + MPC + MBC | 45:40:8:7 |

TABLE 1-continued

| | Lithium salt | | Kind of solvent mixture | | |
|---|---|---|---|---|---|
| | Kind of lithium salt | Concentration mol/L | First solvent | Second solvent | Mixing ratio (by volume) |
| Example P | LiPF$_6$ | 1.0 | 4TFMEC | DMC + MPC + MBC | 55:35:5:5 |
| Example Q | LiPF$_6$ | 1.0 | 4TFMEC + EC | DMC | 35:20:45 |
| Example R | LiPF$_6$ | 1.0 | 4TFMEC + EC | DMC | 35:10:55 |
| Example S | LiPF$_6$ | 1.0 | 4TFMEC + EC | DMC | 45:10:45 |
| Example T | LiPF$_6$ | 1.0 | 4TFMEC + EC | DMC + MPC | 35:20:35:10 |
| Example U | LiPF$_6$ | 1.0 | 4TFMEC + EC | DMC + MPC | 35:10:40:15 |
| Example V | LiPF$_6$ | 1.0 | 4TFMEC + EC | DMC + MPC | 35:5:40:20 |
| Example W | LiPF$_6$ | 1.0 | 4TFMEC + EC | DMC + MPC | 45:10:35:10 |
| Example X | LiPF$_6$ | 1.0 | 4TFMEC + EC | DMC + MPC + MBC | 35:20:35:5:5 |
| Example Y | LiPF$_6$ | 1.0 | 4TFMEC + EC | DMC + MPC + MBC | 35:10:40:8:7 |
| Example Z | LiPF$_6$ | 1.0 | 4TFMEC + EC | DMC + MPC + MBC | 35:5:40:10:10 |
| Example AA | LiPF$_6$ | 1.0 | 4TFMEC + EC | DMC + MPC + MBC | 45:10:35:5:5 |

TABLE 2

| | Lithium salt | | Kind of solvent mixture | | Mixing ratio |
|---|---|---|---|---|---|
| | Kind of lithium salt | Concentration mol/L | First solvent | Second solvent | by (volume) |
| Example A | LiPF$_6$ | 1.0 | EC | DMC | 50:50 |
| Example B | LiPF$_6$ | 1.0 | PC | DMC | 50:50 |
| Example C | LiPF$_6$ | 1.0 | EC | MEC | 50:50 |
| Example D | LiPF$_6$ | 1.0 | PC | DEC | 50:50 |
| Example E | LiPF$_6$ | 1.0 | EC | DME | 50:50 |
| Example A | LiPF$_6$ | 1.0 | 4TFMEC | DME | 50:50 |
| Example B | LiPF$_6$ | 1.0 | 4TFMEC | THF | 50:50 |
| Example C | LiPF$_6$ | 1.0 | 4TFMEC | MEC | 50:50 |
| Example D | LiPF$_6$ | 1.0 | 4TFMEC | MPC | 50:50 |
| Example E | LiPF$_6$ | 1.0 | 4TFMEC | DMC | 30:70 |
| Example F | LiPF$_6$ | 1.0 | 4TFMEC | DMC | 60:40 |
| Example G | LiPF$_6$ | 1.0 | 4TFMEC | DMC + MPC | 45:11:44 |
| Example H | LiPF$_6$ | 1.0 | 4TFMEC + EC | DMC | 30:15:55 |
| Example I | LiPF$_6$ | 1.0 | 4TFMEC + EC | DMC + MPC | 30:15:40:15 |
| Example J | LiPF$_6$ | 1.0 | 3F4FPC | DMC | 50:50 |
| Example K | LiPF$_6$ | 1.0 | 3FPC | DMC | 50:50 |

In Tables 1 and 2 above, 4TFMEC stands for 4-trifluoromethyl-ethylene carbonate, EC stands for ethylene carbonate, PC stands for propylene carbonate, 3F4FPC stands for 3-fluoro-4-fluoro-propylene carbonate, 3FPC stands for 3-fluoro- propylene carbonate, DMC stands for dimethyl carbonate, MPC stands for methyl propyl carbonate, MBC stands for methyl butyl carbonate, DEC stands for diethyl carbonate, MEC stands for methyl ethyl carbonate, DME stands for 1,2-dimethoxyethane and THF stands for tetrahydrofuran.

Extinguishing ability of each of the electrolytes prepared as above was evaluated by such a test that sheet of papers were immersed in respective electrolytes to be tested, and then were set fire by a flame of a burner and thereafter the flame was put out. Thus, the self extinguishing ability was tested by observing if the firing still continued or not, when the flame was put out.

The results are shown in Table 3 below.

TABLE 3

| | After putting out the flame | | After putting out the flame |
|---|---|---|---|
| Example A | fire discontinued | Conventional Example A | fire continued |
| Example B | fire discontinued | Conventional Example B | fire continued |
| Example C | fire discontinued | Conventional Example C | fire continued |
| Example D | fire discontinued | Conventional Example D | fire continued |
| Example E | fire discontinued | Conventional Example E | fire continued |
| Example F | fire discontinued | Comparative Example A | fire continued |
| Example G | fire discontinued | Comparative Example B | fire continued |
| Example H | fire discontinued | Comparative Example C | fire continued |
| Example I | fire discontinued | Comparative Example D | fire continued |
| Example J | fire discontinued | Comparative Example E | fire continued |
| Example K | fire discontinued | Comparative Example F | fire discontinued |

TABLE 3-continued

|  | After putting out the flame |  | After putting out the flame |
|---|---|---|---|
| Example L | fire discontinued | Comparative Example G | fire continued |
| Example M | fire discontinued | Comparative Example H | fire continued |
| Example N | fire discontinued | Comparative Example I | fire continued |
| Example O | fire discontinued | Comparative Example J | fire discontinued |
| Example P | fire discontinued | Comparative Example K | fire discontinued |
| Example Q | fire discontinued |  |  |
| Example R | fire discontinued |  |  |
| Example S | fire discontinued |  |  |
| Example T | fire discontinued |  |  |
| Example U | fire discontinued |  |  |
| Example V | fire discontinued |  |  |
| Example W | fire discontinued |  |  |
| Example X | fire discontinued |  |  |
| Example Y | fire discontinued |  |  |
| Example Z | fire discontinued |  |  |
| Example AA | fire discontinued |  |  |

As it is clear from Tables 1, 2 and 3, while the conventional examples A to E corresponding to the electrolytes corresponding to the conventional batteries continued firing even after putting out the burner's flame, the examples A to AA corresponding to wherein the electrolytes to be used for this invention battery self-extinguished in fire immediately after putting out the burner's flame, without firing continuation. Thus the self extinguishing ability of the examples A–AA according to this invention were confirmed.

In the case of the comparative examples A and D wherein other solvents than dimethyl carbonate are used as the secondary solvent, no self extinguishing ability was observed and the firing continued. In the case of the comparative example G wherein dimethyl carbonate accounts for 20%, the firing continued. Accordingly it is necessary that the volume percentage of dimethyl carbonate should be 40% or more the total of the whole secondary solvents, as shown in the cases of the examples E to P and the examples T to AA. In the case of comparative examples of E, H, I wherein the volume of 4-trifluoromethyl ethylene carbonate is 30% of the total volume of the whole solvents, firing continued. Accordingly, it is necessary that 4-trifluoromethyl-ethylene carbonate accounts for 35% or more.

EXAMPLE 1

Positive and negative electrodes were made as follows. $LiCoO_2$ powder used as an active material for an positive electrode, graphite powder used as an electro-conductive agent, polyfluoro vinylidene resin used as a binder, and N-methyl pyrolidone used as a solvent for the binder were stirred to be mixed by a homogenizer to obtain a slurry active material mixture for a positive electrode. This slurry mixture was coated on one side of an electric collector made of aluminum foil by using a slot die coater, and thereafter was dried at 100° C. in an oven to remove the solvent. The other side of the electric collector was coated therewith and thereafter the solvent was removed by the same manner as above. Thus, after the slurry active material mixture was coated on the both sides of the electric collector, it was then rolled with a roller press to even the thickness of the positive electrolyte active material. It was then subjected to a heat treatment in a vacuum oven to remove the moisture to obtain a positive electrode.

For the negative electrode was made in the following manner. Namely, carbon powder capable of electrochemically occluding and releasing lithium ions, styrene-butadiene rubber type resin and ethyl acetate were stirred to be mixed by a homogenizer to obtain a slurry active material mixture.

This slurry active material mixture was coated on one side of an electric collector made of copper foil by using the slot die coater, and thereafter was dried in the oven to remove the solvent. The other side of the electric collector was also coated therewith and the solvent was removed in the same manner as above. Thus, there was obtained the electric collector coated on both sides thereof with the active material mixture. It was then subjected to a heat treatment so as to cure styrene butadiene rubber type resin, and is then rolled with a heated roller press so as to even the thickness of the active material mixture and was then heat treated to remove the moisture to obtain a negative electrode. The lithium secondary batteries of AA size and with rated capacity of 500 mAh were made by stacking these electrodes through a sponge-shaped micro porous resin made film having a three dimensional structure made of such a polyeolefine resins as polyethylene such as polypropylene or a copolymer thereof, for instance, and it was wound to form a tubular electrode assembly. The spiral electrode assembly thus obtained was put in a tubular container made of stainless steel. The opening of the container was coated, after an electrolyte was poured, to obtain a lithium secondary battery of AA-size with 500 mAh rated capacity.

Each of the batteries thus manufactured was charged and discharged repeatedly in such a manner that it was charged with 0.2 CmA, at a temperature of 25° C. until the battery voltage reached 4.1 V, and after it was allowed to stand for ten minutes, it was discharged with the same current as above until the battery voltage became 2.75 V, and after it was allowed to stand for ten minutes, the charging was carried out again.

As a result, the charge/discharge characteristics of these batteries was measured. The result thereof is shown in FIG. 1.

FIG. 1 shows the discharge characteristics at the tenth cycle at which the charge and discharge states are stabilized. The battery characteristics of the examples A to AA according to this invention are almost the same or much better as that of the conventional batteries A and B. Also, it has been found that the batteries of this invention have a sufficiently large discharge capacity even at a comparatively large current. Further, the battery using the comparative example E in which the volume of the first solvent which is a kind of cyclic esters with a high dielectric constant as the solvent for the electrolyte, is 30% of the total volume of the whole solvents, and the battery using the electrolyte of the comparative example F in which the percentage thereof is 60%, are small in discharge capacity as shown by the examples E, F in FIG. 1. This is presumed to be based on such facts that if the volume of the primary solvent is so large as shown in the comparative example, the viscosity of the electrolyte is high and the internal resistance of the battery is large and the polarization at the charge/discharge is increased, and on the other hand, if the volume of the first solvent is small as shown in the comparative example E, the component of high dielectric constant in the electrolyte is small, and the lithium salt is not sufficiently dissociated to become small in electro-conductivity and the internal resistance of the battery is large and a sufficient charge and discharge reaction is not carried out.

Therefore, the total cyclic esters to be used as the first solvent comprising which contain at least 4-trifluoromethyl ethylene carbonate should be in the range of 35 and 55 vol % thereof.

Further the lithium secondary batteries were produced using the electrolytes corresponding to the example C, the comparative examples J and K in Tables 1 and 2. The same charge/discharge operation as the foregoing was carried out for these batteries.

Figure 2:
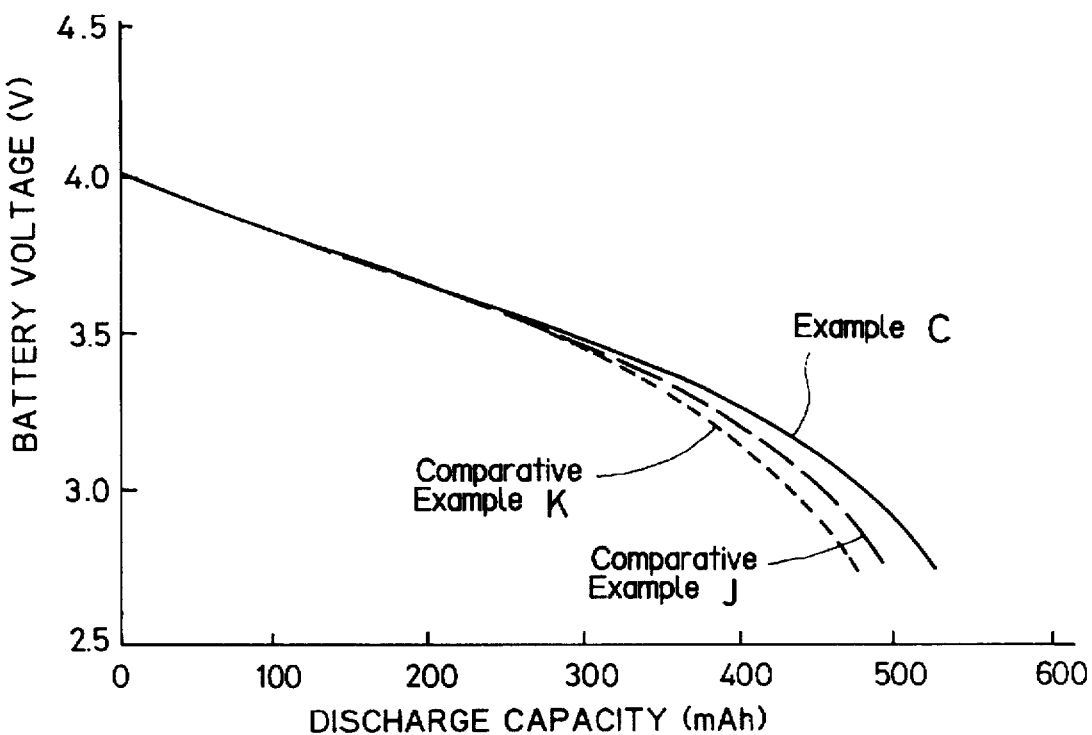
FIG. 2 is a diagram showing charge/discharge characteristics at the 10th cycle or example C and comparative examples J and K in EXAMPLE 3 according to this invention.

FIG. 2 shows that discharge characteristics at the tenth cycle of the charge/discharge cycles. The battery with the example C wherein this invention exhibits superior characteristics to that of the batteries with the comparative examples J and K. It is clear therefrom that the battery using 4-trifluoromethyl-ethylene carbonate exhibits more excellent discharge characteristics than the batteries using other kind of fluorine substituted propylene carbonates. The reason for this is considered to be due to the fact that the electro-chemical stability of 4-trifluoromethyl ethylene carbonate is higher than the other kinds of fluorine substituted propylene carbonates.

Though in the above EXAMPLE 1, $LiCoO_2$ was used for the positive electrode active material, carbon material capable of electro-chemically occluding and releasing lithium ions was used for the negative active material and $LiPF_6$ was used for the solute just for example, but it have been found that any other materials as enumerated in the above EMBODIMENT 1 can be used to bring about the similar good efforts.

As mentioned above, the above EMBODIMENT of this invention can provide a lithium secondary battery which is especially excellent in battery and is safe with self extinguishing ability.

EMBODIMENT 2

Next, a further another EMBODIMENT of this invention for providing a lithium secondary battery with high safety and improved discharge characteristics particularly at a low temperature will be described as follows:

A solvent to be used for organic electrolyte of the lithium secondary battery comprises a solvent mixture of cyclic esters as the first solvent and chain esters as the second solvent, and the first solvent of the solvent mixture comprises at least 4-trifluoromethyl-ethylene carbonate and the second solvent thereof comprises at least one kind of dimethyl carbonate and methyl ethyl carbonate, and also the mixing ratio thereof is defined as follows:

For other cyclic esters used for the first solvent and other chain esters used for the second solvent, at least one kind of those as enumerated below.

As cyclic esters to be used as the first solvent are propylene carbonate, ethylene carbonate, butylene carbonate, γ-butyl lactone, vinylene carbonate, 2-methyl-γ-butyl lactone, acetyl-γ-butylo lactone, γ-valero-lactone, etc. These may be mixed with any kind of fluorine substituted propylene carbonates.

As to chain esters to be used as the second solvent are methyl ethyl carbonate, methyl propyl carbonate, isopropyl methyl carbonate, methyl butyl carbonate, diethyl carbonate, ethyl propyl carbonate, ethyl butyl carbonate, dipropyl carbonate, butyl propyl carbonate, dibutyl carbonate, alkyl propionates, dialkyl malonates, alkyl acetates, acetic acid alkyl esters, etc. One or more of the above esters may be mixed with dimethyl carbonate. According to this invention, if the volume of the first solvent is 35 to 55% of the total volume of the whole solvents and that of the second solvent is 45 to 65% thereof, and the volume of 4-trifluoromethyl ethylene carbonate is 35%–55% thereof and the volume of dimethyl carbonate is 40 to 80% of the second solvent, and, the total volume of diethyl carbonate and methyl ethyl carbonate is 20 to 60% of the total volume of the whole second solvents.

For lithium salts to be used for the solute for an organic electrolytes are not necessarily limited, as long as they are capable of dissociating in the organic solvent and releasing lithium ions, any kind of those enumerated in the EMBODIMENT 1 can be selectively used.

For the positive electrode active materials, any kind of those as enumerated in EMBODIMENT 1 can be selectively used. As mentioned above, the lithium containing salts with the structure of $\alpha$-$NaCrO_2$ such as $LiCoO_2$, $LiNiO_2$, $LiMnO_2$ etc. or $LiMn_2O_4$ or the like are preferable since the high discharge voltage is high and electrode-chemical stability is excellent by using them, as mentioned above.

For the negative active materials, any kind of those selected out of those as enumerated in the foregoing EMBODIMENT can be used.

As can be seen in the foregoing EXAMPLES 1, 4-trifluoromethyl ethylene carbonate exhibits especially excellent self extinguishing ability when it is mixed with dimethyl carbonate, though its mechanism is not clean, and, as explained in detail as above, if all hydrogens of the methyl group of propylene carbonates are substituted with fluorine, electron donating from this portion becomes less, and electro-chemical stability is increased, and, as a result, it prevents or depressed the decomposition thereof during the charge and discharge cycles and provides the batteries with excellent charge and discharge characteristics.

However, as a result of repeated tests, it has been found that the first solvent consisting of 4-trifluoromethyl-ethylene carbonate alone is poor in the battery performance at a low temperature.

On the assumption that when addition of any solvent with relatively high electrode-conductivity even at a lower temperature may improve the battery performance, various tests were carried out. As a result, it has been found through repeated tests that when dimethyl carbonate is added thereto, the battery performance at a lower temperature can be improved.

It has also been found that the volume of 4-trifluoromethyl-ethylene carbonate used as the first solvent should be in the range of 35–55% of the total volume of the whole solvents. If it is less than 35%, the self extinguishing ability is decreased, and if it is more than 55%, the internal resistance is increased, and, the battery performance is decreased. For other cyclic esters can be mixed therewith as the first solvent. These cyclic esters have high dielectric constant and have a function to dissociate the lithium salt to be used as a solute. The volume percentage of the first solvent comprising at least 4-trifluoromethyl-ethylene carbonate should be in the range of 35%–55% volume of the whole solvents. If it is less than 35%, it makes it impossible to sufficiently dissociate the lithium salt, so that the internal resistance is increased and it becomes difficult to take out a sufficient capacity. If it is more than 55%, the viscosity is heightened and the mobility of lithium ions is deceased and the internal resistance is increased.

On the other hand, the second solvent comprising chain esters prepared by mixing at least one selected from the group of diethyl carbonate and methyl ethyl carbonate with dimethyl carbonate brings about high electro-chemically stability, and is necessary to lower the high viscosity of the first solvent and increase the electro-conductivity, but is low in dielectric constant and has a poor function to dissociate lithium salts. The volume of the second solvent should be in the range of 45–65 vol % of the total volume of the whole solvents. If it is less than 45%, a sufficient effect of decreasing the viscosity can not be obtained, and it causes to the volume of the first solvent, that is, 4-trifluoromethyl-ethylene carbonate, to decrease to less than 35%, resulting in lowering the dissociation degree of the lithium salt and increasing in the internal resistance.

For the volume of dimethyl carbonate should be in the range of 40–80% of the total volume of the whole second solvents. The volume of at least one kind selected from the group of methyl ethyl carbonate and diethyl carbonate as the second solvent should be in the range of 20 to 60% of total volume of the whole second solvents. If the volume of dimethyl carbonate is less than 40%, it does not exhibit the self extinguishing ability. If the total volume of methyl ethyl carbonate, and diethyl ethyl carbonate is less than 20%, the improvement in the battery performance at a low temperature can not be obtained sufficiently.

TEST EXAMPLE 2

The following tests were carried out to ascertain the self extinguishing ability of the electrolyte to be used for this invention battery.

Out of lithium salts, $LiPF_6$ was used as a solute, and the electrolytes were prepared by dissolving it in various solvent mixtures as listed in Tables 4 and 5 as shown, so as to adjust the solute concentration to become 1 mol/l.

The mixing ratio is shown by volume.

TABLE 4

| | Lithium salt | | Kind of solvent mixture | | |
|---|---|---|---|---|---|
| | Kind of lithium salt | Concentration mol/L | First solvent | Second solvent | Mixing ratio (by volume) |
| Example A | $LiPF_6$ | 1.0 | 4TFMEC | DMC | 35:26:39 |
| Example B | $LiPF_6$ | 1.0 | 4TFMEC | DMC + MEC | 35:39:26 |
| Example C | $LiPF_6$ | 1.0 | 4TFMEC | DMC + DEC | 35:52:13 |
| Example D | $LiPF_6$ | 1.0 | 4TFMEC | DMC + MEC | 45:22:33 |
| Example E | $LiPF_6$ | 1.0 | 4TFMEC | DMC + MEC | 45:33:22 |
| Example F | $LiPF_6$ | 1.0 | 4TFMEC | DMC + MEC | 45:44:11 |
| Example G | $LiPF_6$ | 1.0 | 4TFMEC | DMC + MEC | 50:20:30 |
| Example H | $LiPF_6$ | 1.0 | 4TFMEC | DMC + MEC | 50:30:20 |
| Example I | $LiPF_6$ | 1.0 | 4TFMEC | DMC + MEC | 50:40:10 |
| Example J | $LiPF_6$ | 1.0 | 4TFMEC | DMC + MEC | 55:18:27 |
| Example K | $LiPF_6$ | 1.0 | 4TFMEC | DMC + MEC | 55:27:18 |
| Example L | $LiPF_6$ | 1.0 | 4TFMEC | DMC + MEC | 55:36:9 |
| Example M | $LiPF_6$ | 1.0 | 4TFMEC | DMC + DEC | 35:26:39 |
| Example N | $LiPF_6$ | 1.0 | 4TFMEC | DMC + DEC | 50:30:20 |
| Example O | $LiPF_6$ | 1.0 | 4TFMEC | DMC + DEC | 35:52:13 |
| Example P | $LiPF_6$ | 1.0 | 4TFMEC | DMC + DEC + MEC | 35:26:20:19 |
| Example Q | $LiPF_6$ | 1.0 | 4TFMEC | DMC + DEC + MEC | 35:52:6:7 |
| Example R | $LiPF_6$ | 1.0 | 4TFMEC | DMC + DEC + MEC | 55:18:14:13 |
| Example S | $LiPF_6$ | 1.0 | 4TFMEC | DMC + DEC + MEC | 55:36:4:5 |
| Example T | $LiPF_6$ | 1.0 | 4TFMEC | DMC + MEC + MPC | 35:26:13:26 |
| Example U | $LiPF_6$ | 1.0 | 4TFMEC | DMC + DEC + MEC + MPC | 35:26:6:7:26 |
| Example V | $LiPF_6$ | 1.0 | 4TFMEC | DMC + MEC + MPC | 55:18:9:18 |
| Example W | $LiPF_6$ | 1.0 | 4TFMEC | DMC + DEC + MEC + MPC | 55:18:5:4:26 |
| Example X | $LiPF_6$ | 1.0 | 4TFMEC + EC | DMC + MEC | 35:20:18:27 |
| Example Y | $LiPF_6$ | 1.0 | 4TFMEC + EC | DMC + MEC + MEC | 35:20:18:14:13 |
| Example Z | $LiPF_6$ | 1.0 | 4TFMEC + EC | DMC + MEC + MPC | 35:20:18:9:18 |
| Example AA | $LiPF_6$ | 1.0 | 4TFMEC + EC | DMC + DEC + MEC + MPC | 35:20:18:5:4:26 |

TABLE 5

| | Lithium salt | | Kind of solvent mixture | | |
|---|---|---|---|---|---|
| | Kind of lithium salt | Concentration mol/L | First solvent | Second solvent | Mixing ratio (by volume) |
| Conventional Example A | $LiPF_6$ | 1.0 | EC | DMC | 50:50 |
| Conventional Example B | $LiPF_6$ | 1.0 | PC | DMC | 50:50 |
| Conventional Example C | $LiPF_6$ | 1.0 | EC | MEC | 50:50 |
| Conventional Example D | $LiPF_6$ | 1.0 | PC | DEC | 50:50 |
| Conventional Example E | $LiPF_6$ | 1.0 | EC | DME | 50:50 |
| Conventional Example A | $LiPF_6$ | 1.0 | 4TFMEC | DME | 50:50 |
| Conventional Example B | $LiPF_6$ | 1.0 | 4TFMEC | THF | 50:50 |
| Conventional Example C | $LiPF_6$ | 1.0 | 4TFMEC | MEC | 50:50 |
| Conventional Example D | $LiPF_6$ | 1.0 | 4TFMEC | DEC + MEC | 50:25:25 |
| Conventional Example E | $LiPF_6$ | 1.0 | 4TFMEC | DMC | 50:50 |
| Conventional Example F | $LiPF_6$ | 1.0 | 4TFMEC | DMC + MPC | 50:30:20 |

TABLE 5-continued

|  | lithium salt | | Kind of solvent mixture | | |
|---|---|---|---|---|---|
|  | Kind of lithium salt | Concentration mol/L | First solvent | Second solvent | Mixing ratio (by volume) |
| Conventional Example G | LiPF$_6$ | 1.0 | 4TFMEC | DMC + MEC | 30:42:28 |
| Conventional Example H | LiPF$_6$ | 1.0 | 4TFMEC | DMC + MEC | 60:24:16 |
| Conventional Example I | LiPF$_6$ | 1.0 | 4TFMEC | DMC + MEC | 50:10:40 |
| Conventional Example J | LiPF$_6$ | 1.0 | 4TFMEC | DMC + MEC | 50:45:5 |
| Conventional Example K | LiPF$_6$ | 1.0 | 4TFMEC | DMC + MEC + MPC | 50:10:5:35 |
| Conventional Example L | LiPF$_6$ | 1.0 | 4TFMEC + EC | DMC + MEC | 35:25:24:16 |
| Conventional Example M | LiPF$_6$ | 1.0 | 3F4FPC | DMC + MEC | 50:30:20 |
| Conventional Example N | LiPF$_6$ | 1.0 | 3FPC | DMC + MEC | 50:30:20 |

In Tables 4 and 5, 4TFMEC stands for 4-trifluoromethyl-ethylene carbonate, EC stands for ethylene carbonate, PC stands for propylene carbonate, 3F4FPC stands for 3-fluoro-4-fluoro-propylene carbonate, 3FPC stands for 3-fluoro-propylene carbonate, DMC stands for dimethyl carbonate, MEC stands for methyl ethyl carbonate, DEC stands for diethyl carbonate, MPC stands for methyl propyl carbonate, MPC stands for methyl propyl carbonate, DME stands for 1,2-dimethoxyethane, THF stands for tetrahydrofuran. The extinguishing ability of the electrolyte thus prepared was tested for evaluation by such a manner that is the same as carried out in the foregoing TEST EXAMPLE 1. The following Table shows the results thereof.

TABLE 6

|  | After putting out the flame |  | After putting out the flame |
|---|---|---|---|
| Example A | fire discontinued | Conventional Example A | fire continued |
| Example B | fire discontinued | Conventional Example B | fire continued |
| Example C | fire discontinued | Conventional Example C | fire continued |
| Example D | fire discontinued | Conventional Example D | fire continued |
| Example E | fire discontinued | Conventional Example E | fire continued |
| Example F | fire discontinued | Comparative Example A | fire continued |
| Example G | fire discontinued | Comparative Example B | fire continued |
| Example H | fire discontinued | Comparative Example C | fire continued |
| Example I | fire discontinued | Comparative Example D | fire continued |
| Example J | fire discontinued | Comparative Example E | fire discontinued |
| Example K | fire discontinued | Comparative Example F | fire discontinued |
| Example L | fire discontinued | Comparative Example G | fire continued |
| Example M | fire discontinued | Comparative Example H | fire discontinued |
| Example N | fire discontinued | Comparative Example I | fire continued |
| Example O | fire discontinued | Comparative Example J | fire discontinued |
| Example P | fire discontinued | Comparative Example K | fire continued |
| Example Q | fire discontinued | Comparative Example L | fire discontinued |
| Example R | fire discontinued | Comparative Example M | fire discontinued |
| Example S | fire discontinued | Comparative Example N | fire discontinued |
| Example T | fire discontinued |  |  |
| Example U | fire discontinued |  |  |

TABLE 6-continued

|  | After putting out the flame | After putting out the flame |
|---|---|---|
| Example V | fire discontinued |  |
| Example W | fire discontinued |  |
| Example X | fire discontinued |  |
| Example Y | fire discontinued |  |
| Example Z | fire discontinued |  |
| Example AA | fire discontinued |  |

As it is clear from Table 6, while the conventional examples A to E using the electrolytes used in the conventional batteries continued firing even after putting out the burner's flame, the examples A to AA using the electrolytes to be used for batteries of this invention extinguished in the fire immediately after putting out the burner's flame, without firing continuation. Thus, the self extinguishing abilities of the examples of this invention were confirmed.

The comparative examples of A to D using others than dimethyl carbonate as the secondary solvent has no self extinguishing ability and continued firing. The comparative examples, I, K wherein the volume of dimethyl carbonate accounts for 20% of the total volume of the secondary solvents continued firing. Accordingly, as indicated in examples A, D, G, J, M, P, R and T to Y, it is necessary for the self extinguishing ability that the volume of dimethyl carbonate is 40% or more thereof. The comparative examples G wherein the volume percentage of 4-trifluoromethyl-ethylene carbonate is 30% of the total volume of the whole solvents, the firing continued. Accordingly, it has been found that 4-trifluoromethyl-ethylene carbonate should be 35% or more thereof.

EXAMPLE 2

Positive and negative electrodes were produced in such a manner described in the EXAMPLE 1. These electrodes were stacked one upon another through the same separator as used in the foregoing EXAMPLE 2 to assemble a lithium secondary battery of a AA size and with rated capacity of 500 mAh AA.

The electrolytes corresponding to the examples A to AA, the conventional examples A and B and the comparative examples G, H, L as shown in Tables 4 and 5 were poured in the respective batteries thus produced above.

Each of the batteries thus manufactured was charged and discharged repeatedly in such a manner that it was charged with 0.2 CmA, at a temperature of 25° C. until the battery voltage reached 4.1 V, and after it was allowed to stand for ten minutes, it was discharged with the same current as above until the battery voltage became 2.75 V, and after it was allowed to stand for ten minutes, the charging was carried out again. After the repetition of such charge/discharge cycles, discharge characteristics thereof was measured. The results thereof are shown in FIG. 7.

Figure 3:
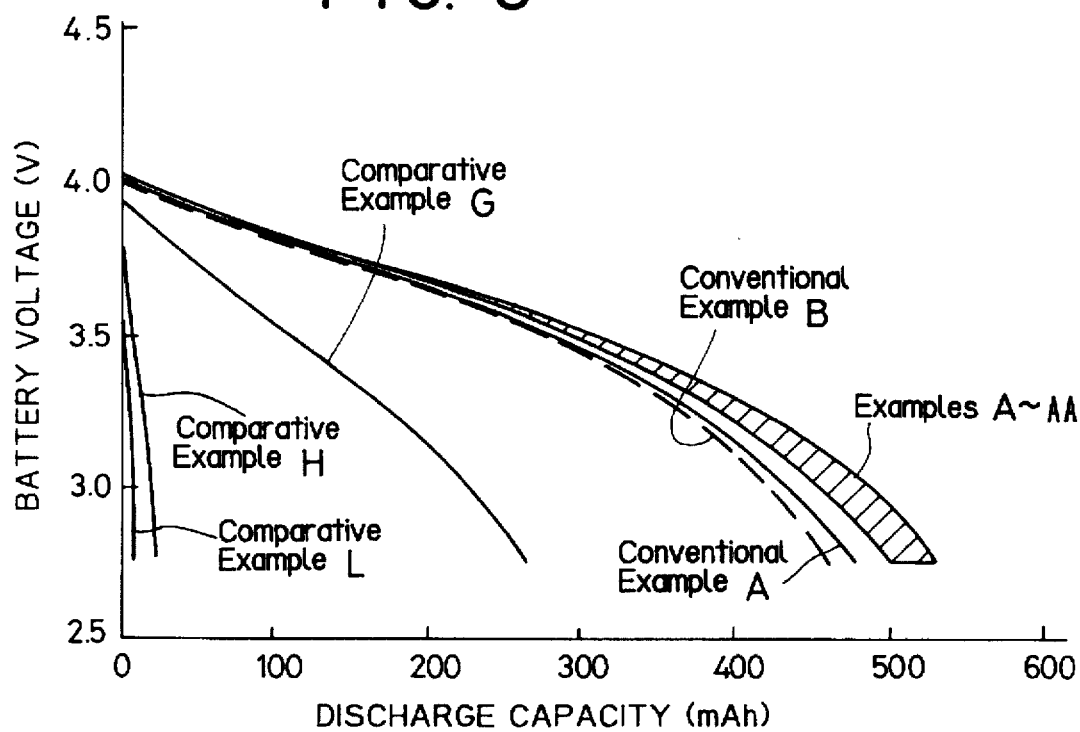
FIG. 3 is a diagram showing charge/discharge characteristics at the 10th cycle for examples A to AA, conventional examples A and B and comparative examples G, H and L in EXAMPLE 4 according to this invention.

FIG. 3 shows that discharge characteristics thereof at the tenth cycle at which charge/discharge states are stabilized. The discharge characteristics of the batteries of examples A to AA according to this invention are similar, or much better to that of the conventional batteries of comparative examples A and B.

The battery using the electrolyte of the comparative example G in which the volume of the first solvent comprising the cyclic ester, which is a component having a high dielectric constant as a solvent for the electrolyte, is 30% of the total volume of the whole solvents, and the batteries using the electrolytes of the comparative examples H and L wherein the volume percentage of the first solvent is 60% thereof are small in the discharge capacity as shown in the comparative examples G, H, L. This is considered to be caused by the facts that, if the volume of the first solvent is so large as shown in the comparative examples H, L, the viscosity of the electrolyte is increased, and the internal resistance of the battery is increased, and the polarization at the time of the charge and discharge becomes large, and on the other hand, if the volume of the first solvent is so small as shown in the comparative example G, the solvent with a high dielectric constant in the electrolyte is small, and the lithium salt is not sufficiently dissociated, and the electro-conductivity of the electrolyte is small and further the internal resistance thereof becomes large and a sufficient charge/discharge reaction is not achieved.

Therefore, it is necessary that the volume of the first solvent comprising at least 4-trifluoromethyl-ethylene carbonate should be in the range of 35 and 55% of the total volume of the whole solvents.

Further, the lithium secondary batteries using the electrolytes of the example H, the comparative examples of M and N as shown in Table 4 and 5 were produced, and the charge and discharge tests were carried out for these batteries in such a manner as described in the foregoing ones.

Figure 4:
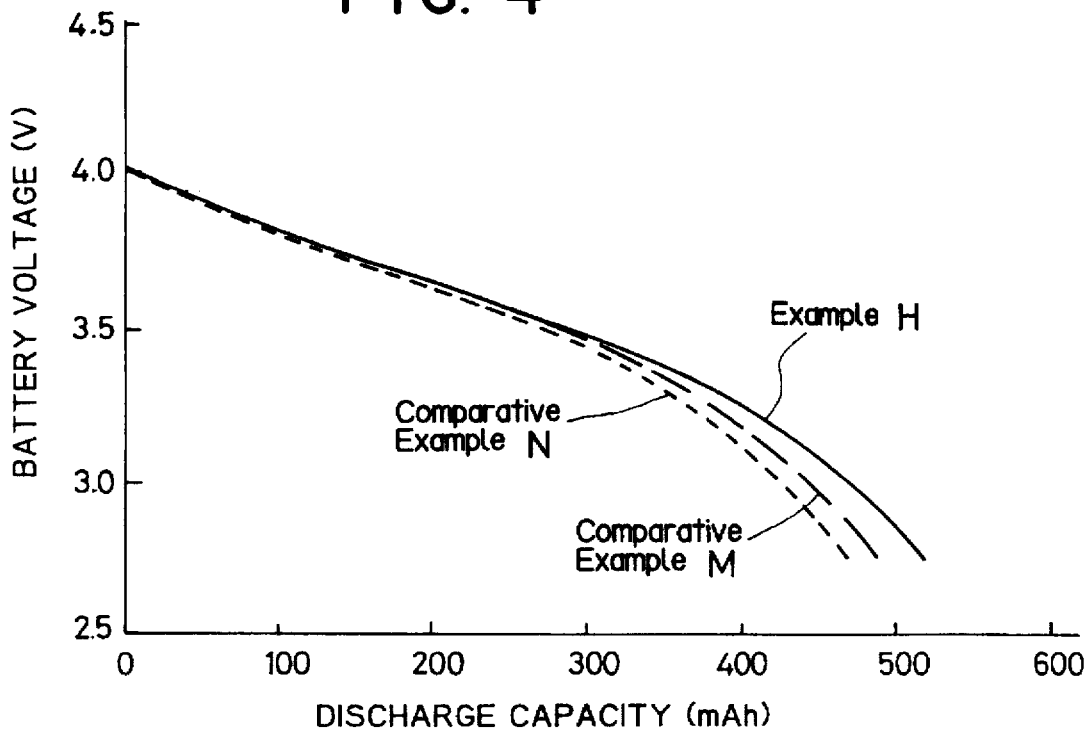
FIG. 4 is a diagram showing charge/discharge characteristics at the 10th cycle for example H and comparative example N in EXAMPLE 4 according to this invention.

FIG. 4 shows the discharge characteristics at the tenth of cycle of the charge/discharge cycles. The example H of this invention exhibits superior discharge characteristics to that of the comparative examples M and N. Thus it is clear therefrom that the batteries using 4-trifluoromethyl-ethylene carbonate exhibit excellent discharge characteristics as compared with the other fluorine substituted propylene carbonates than that. This is considered to be due to the facts that the electro-chemical stability of 4-trifluoromethyl ethylene carbonate is higher than that of other fluorine substituted propylene carbonates.

Further, each of the batteries using the examples A to AA, the conventional examples A to D and the comparative examples E, F and J was carried out as follows:

Each of the batteries thus manufactured was charged and discharged repeatedly in such a manner that it was charged with 0.2 CmA, at a temperature of 25° C. until the battery voltage reached 4.1 V, and after it was allowed to stand for ten minutes, it was discharged with the same current as above at the temperature of −20° C. as above until the battery voltage vecame 2.75 V, and after it was allowed to stand for ten minutes, the charging was carried out again. The following Table 7 shows the results thereof.

TABLE 7

| | Discharge capacity rate (%) | | Discharge capacity rate (%) |
|---|---|---|---|
| Example A | 80 | Conventional Example A | 56 |
| Example B | 79 | Conventional Example B | 62 |
| Example C | 76 | Conventional Example C | 60 |
| Example D | 82 | Conventional Example D | 43 |
| Example E | 81 | Comparative Example E | 34 |
| Example F | 78 | Comparative Example F | 21 |
| Example G | 77 | Comparative Example J | 44 |
| Example H | 77 | | |
| Example I | 75 | | |
| Example J | 75 | | |
| Example K | 75 | | |
| Example L | 73 | | |
| Example M | 74 | | |
| Example N | 75 | | |
| Example O | 72 | | |
| Example P | 74 | | |
| Example Q | 75 | | |
| Example R | 73 | | |
| Example S | 73 | | |
| Example T | 75 | | |
| Example U | 73 | | |
| Example V | 72 | | |
| Example W | 72 | | |
| Example X | 70 | | |
| Example Y | 71 | | |
| Example Z | 70 | | |
| Example AA | 70 | | |

As is clear from Table 7, the batteries of this invention A to AA using the electrolyte A to AA as shown in Tables 4 and 5, are 70% or more in the discharge capacity rate while the conventional batteries A to D using the conventional example A to D are 43–62% in the discharge capacity rate. Thus, it has been found that there can be obtained the batteries using the electrolytes of this invention can be much improved in the discharge capacity at a low temperature, that is, the low temperature characteristics, as compared with the conventional batteries using the conventional electrolytes.

Further, as can be seen in the cases of this comparative batteries E, F, J using the electrolytes of the comparative examples E, F, J, in the cases of the comparative examples E, F wherein methyl ethyl carbonate (MEC) is not mixed and the case of the comparative example J wherein the volume of methyl ethyl carbonate is 10% of the second solvent, the discharge capacities thereof are as low as 21 to 34% and 44%, respectively, resulting in no effect on the temperature characteristics.

While in the above examples, $LiCoO_2$ was used for the positive electrode active material and carbon materials capable of electro-chemically occluding and releasing lithium ions was used for the negative electrode and $LiPF_6$ was used for the solute just for example, other materials as listed in the above also can be used to obtain similar effects.

As mentioned above, this invention can provide lithium secondary battery with not only high performance, self extinguishing ability and high safety, but also excellent charge/discharge characteristics in the low temperature zone.

EMBODIMENT 3

A further another embodiment of this invention for providing a lithium secondary battery which is remarkably improved in especially in the charge and discharge efficiency of the negative electrode at the initial stage of the charge and discharge cycles in respect to this kind of the lithium secondary battery using carbon material as a negative active materials, will be explained as follows:

More particularly, among fluoro substituted propylene carbonates, when 4-trifluoromethyl-ethylene carbonate is used, the above mentioned effects can be brought about. In this case, especially high charge/discharge characteristics can be obtained when at least one kind selected from the group consisting of dimethyl carbonate, methyl ethyl carbonate, diethyl carbonate, methyl ethyl carbonate, diethyl carbonate, methyl propyl carbonate, and methyl butyl carbonate, is used as the second solvent. Also in this case, by defining the mixing ratio of the first solvent to the second solvent, there can be obtained such an battery performance that is especially low in the reactivity between the negative the electrode material and the electrolyte and is excellent high rate charge/discharge characteristics.

EXAMPLE 3

A negative electrode made of burned coke powder used as an active material was produced in the following manner. Namely, burned coke powder capable of electro-chemically occluding and releasing lithium ions, styrene-butadiene rubber type resin and ethyl acetate were stirred to be mixed by a homogenizer to obtain a slurry active material mixture. This slurry active material mixture was coated on one side of an electric collector made of copper foil by using the slot die coater, and thereafter was dried in the oven to remove the solvent. The other side of the electric collector was also coated therewith and the solvent was removed in the same manner as above. Thus, there was obtained the electric collector coated on both sides thereof with the active material mixture. It was then subjected to a heat treatment so as to cure styrene butadiene rubber type resin, and is then rolled with a heated roller press so as to even the thickness of the active material mixture and was then heat treated to remove the moisture to obtain the negative electrode. It was used as the test electrode. By using it together with the counter electrode and the reference electrode made of lithium metal, three-polar beaker type cell was produced. The organic electrolytes comprising as a solute the lithium salt and solvents for electrolytes as shown in Table 8 were poured in these cells thus produced as mentioned above to make the cells of the example A, the conventional example A and the comparative examples A to C, respectively.

TABLE 8

| | Lithium salt | | Kind of |
|---|---|---|---|
| | Kind of lithium salt | Concentration mol/L | solvent for electrolyte |
| Example A | LiPF$_6$ | 1.0 | 4TFMEC |
| Conventional Example A | LiPF$_6$ | 1.0 | PC |
| Comparative Example A | LiPF$_6$ | 1.0 | 3F4FPC |
| Comparative Example B | LiPF$_6$ | 1.0 | 3FPC |
| Comparative Example C | LiPF$_6$ | 1.0 | 4FPC |

In Table 8 above, TFMEC stands for 4-trifluoromethyl-ethylene carbonate, PC stands for propylene carbonate, 3F4FPC stands for 3-fluoro-4-fluoro propylene carbonate, 3FPC stands for 3-fluoro-propylene carbonate, 4FPC stands for 4-fluoro-propylene carbonate.

Using these cells, each cell was charged and discharged in such a manner that it was charged with a current density of 0.1 mA/cm$^2$, at a temperature of 25° C. to occlude lithium ions until the electric potential of the test negative electrode became 0 V to the reference electrode, and, after it was allowed to stand for 10 minutes, it was discharged with the same current density to release lithium ions until the electric potential of the test negative electrode became 1.5 V to the reference electrode.

Table 9 below shows the charge and discharge efficiency of the cells using the examples A, the conventional example A and the comparative examples A to C.

TABLE 9

| | Charge/discharge efficiency (%) |
|---|---|
| Example A | 94 |
| Conventional Example A | 63 |
| Comparative Example A | 92 |
| Comparative Example B | 91 |
| Comparative Example C | 90 |

It has been proved that the charge/discharge efficiency when using the example A according to this invention is well over that when using the conventional example A. It can be seen from the above results, that the case of use of this electrode can lower the reactivity between the electrolyte and the burned coke material and can decrease the capacity loss at the first cycle, as compared with the case of use of the conventional electrolyte.

It is found from the comparison between the example and the comparative examples that 4-trifluoromethyl-ethylene carbonate has more excellent charge/discharge characteristics, which is much better than using other types of fluorine substituted propylene carbonates. This is considered to be due to the higher electro-chemical stability of 4-trifluoromethyl-ethylene carbonate.

EXAMPLE 4

The negative electrode was produced in the same manner as the foregoing EXAMPLE 3 except for that artificial black lead material was used instead of burned coke powder. The three polar beaker type cells were made in the same manner as described in the foregoing EXAMPLE 3 with the exception of use of artificial black lead as a working electrode.

Using these cells, after the organic electrolytes of the example A, the conventional examples A and the comparative examples A to C as shown in the foregoing Table 8, were poured therein. Using these cells, each cell was charged and discharged in such a manner that it was charged with a current density of 0.1 mA/cm$^2$, at a temperature of 25° C. to occlude lithium ions until the electric potential of the test negative electrode became 0 V to the reference electrode, and, after ti was allowed to stand for 10 minutes, it was discharged with the same current density to release lithium ions until the electric potential of the test negative electrode became 1.5 V to the reference electrode.

Table 10 below shows the charge and discharge efficiency of the cells of the example A, the conventional example A and the comparative examples A to C.

TABLE 10

| | Charge/discharge efficiency (%) |
|---|---|
| Example A | 90 |
| Conventional Example A | — |

TABLE 10-continued

| | Charge/discharge efficiency (%) |
|---|---|
| Comparative Example A | 87 |
| Comparative Example B | 85 |
| Comparative Example C | 85 |

It is clear from Table 10 that in the cell using the conventional example A as the electrolyte, almost all of charging electric quantity were spent for the reaction between the electrolyte and the carbon material of the negative electrode, so that the electric capacity could not be taken out at the time of discharging. Whereas, in the cells using the example A as the electrolyte, the charge and discharge performance becomes possible, and even in the case of artificial black lead material which has a higher reactivity with the electrolyte, the use of 4-trifluoromethyl-ethylene carbonate serves to be very effective in suppressing the reaction between the electrolyte and the carbon material.

From comparison between the example and the comparative examples, it can be seen that the example using 4-trifluoromethyl-ethylene carbonate exhibits more excellent charge/discharge characteristics, which is much better than other kinds of fluorine substituted propylene carbonates. This is considered to be due to the higher electrochemical stability of 4-trifluoromethyl-ethylene carbonate.

EXAMPLE 5

Using the three-polar beaker type cells same as used in the foregoing EXAMPLE 3, the organic electrolytes of the examples B to J and the conventional examples B and C as shown in Table 11 below were poured therein.

Using these cells, after the organic electrolytes of the example A, the conventional examples A and the comparative examples A to C as shown in the foregoing Table 8, are poured therein. Using these cells, each cell was charged and discharged in such a manner that it was charged with a current density of 0.1 mA/cm$^2$, at a temperature of 25° C. to occlude lithium ions until the electric potential of the test negative electrode became 0 V to the reference electrode, and, after it was allowed to stand for 10 minutes, it was discharged with the same current density to release lithium ions until the electric potential of the test negative electrode became 1.5 V to the reference electrode.

TABLE 11

| | Lithium salt | | Kind of solvent for electrolyte | |
|---|---|---|---|---|
| | Kind of lithium salt | Concentration mol/L | Solvent mixture | Mixing ratio (by volume) |
| Example B | LiPF$_6$ | 1.0 | 4TFMEC + DMC | 50:50 |
| Example C | LiPF$_6$ | 1.0 | 4TFMEC + MEC | 50:50 |
| Example D | LiPF$_6$ | 1.0 | 4TFMEC + DEC | 50:50 |
| Example E | LiPF$_6$ | 1.0 | 4TFMEC + MPC | 50:50 |
| Example F | LiPF$_6$ | 1.0 | 4TFMEC + MBC | 50:50 |
| Example G | LiPF$_6$ | 1.0 | 4TFMEC + DME | 50:50 |
| Example H | LiPF$_6$ | 1.0 | 4TFMEC + THF | 50:50 |
| Example I | LiPF$_6$ | 1.0 | 4TFMEC + EBC | 50:50 |
| Example J | LiPF$_6$ | 1.0 | 4TFMEC + DBC | 50:50 |
| Conventional Example B | LiPF$_6$ | 1.0 | PC + DMC | 50:50 |
| Conventional Example C | LiPF$_6$ | 1.0 | PC + DEC | 50:50 |

In Table 11, 4TFMEC stands for 4-trifluoromethyl-ethylene carbonate, PC stands for propylene carbonate, DMC stands for dimethyl carbonate, MEC stands for methyl ethyl carbonate, DEC stands for diethyl carbonate, MPC stands for methyl propyl carbonate, MBC stands for methyl butyl carbonate, DME stands for dimethoxy ethane, THF stands for tetrahydroxyfuran, EBC stands for ethyl butyl carbonate, DBC stands for dibutyl carbonate.

Table 12 below shows the charge/discharge efficiency of the cells using the examples B to J and the conventional examples B and C.

TABLE 12

| | Charge/discharge efficiency (%) |
|---|---|
| Example B | 91 |
| Example C | 90 |
| Example D | 87 |
| Example E | 87 |
| Example F | 85 |
| Example G | 78 |
| Example H | 74 |
| Example I | 81 |
| Example J | 79 |
| Conventional Example B | 69 |
| Conventional Example C | 67 |

It has been proved that the charge/discharge efficiency when using the examples B to J according to this invention is well over that when using the conventional examples B and C. It has been found also that, even when 4-trimethyl-ethylene carbonate is used to be mixed with various kinds of low viscous solvents, the effect of suppressing the reaction between the burned coke material for the electrode and the electrolyte can be maintained and more larger charger/discharge efficiency than the case of using the conventional electrolytes can be obtained as compared with the case of using the conventional electrolytes.

As can be seen from the comparison between the group of the examples B and F and the group of the examples G to J, the charge and discharge efficiency of the negative electrode becomes such a high value as 85% or more when any solvent selected from the group of dimethyl carbonate, methyl ethyl carbonate, diethyl carbonate, methyl propyl carbonate and methyl butyl carbonate is used as the second solvent, and there can be obtained an especially high charge and discharge efficiency in comparison with the case where the other, esters or chain carbonates having a large molecule weight are used as the solvent for lowering of the viscosity of the first solvent.

Further when EXAMPLE 6 is compared with the case of the foregoing EXAMPLE 4, it can be seen therefrom that even when the cells according to this invention is charged with the current density as ten times as the case of the EXAMPLE 3, the solvent mixture of 4-trifluoromethyl-ethylene carbonate and the second solvent can offer such an organic electrolyte that is excellent in high charge/discharge efficiency and high rate charge/discharge characteristics of the burned coke material as a negative electrode.

EXAMPLE 6

Using the three-polar beaker type cells same as in the foregoing EXAMPLE 4, the organic electrolytes of the examples B to J and the conventional example B and C as shown in Table 13 below were poured therein.

Each cell was charged and discharged in such a manner that it was charged with a current density of 1.0 mA/cm$^2$ at a temperature of 25° C. to occlude lithium ions until the electric potential of the test negative electrode became 0 V to the reference electrode, and, after it was allowed to stand for 10 minutes, it was discharged with the same current density to release lithium ions until the electric potential of the test negative electrode became 1.5 V to the reference electrode.

Table 13 below shows the charge/discharge efficiency of the cells using the examples B to J and the conventional examples B and C.

TABLE 13

|  | Charge/discharge efficiency (%) |
|---|---|
| Example B | 86 |
| Example C | 84 |
| Example D | 83 |
| Example E | 81 |
| Example F | 78 |
| Example G | 64 |
| Example H | 52 |
| Example I | 71 |
| Example J | 69 |
| Conventional example B | — |
| Conventional example C | — |

It is clear from Table 13 that in the cells using the conventional examples B and C as the electrolyte, almost all of charging electric quantity were spent for the reaction between the electrolyte and the active carbon material of the negative electrode, so that the electric capacity could not be taken out at the time of discharging. Whereas, in the cells using the examples B to J as the electrolyte, the charge and discharge performance becomes possible, and even in the case of use of artificial black lead which has a higher reactivity with the electrolyte, the use of 4-trifluoromethyl-ethylene carbonate is very effective in suppressing the reaction between the electrolyte and the carbon material even 4-trifluoromethyl-ethylene carbonate is used to be mixed with various kinds of low viscous solvents, as similar to the case of using burned coke material for the negative electrode.

As can be seen from the comparison between the group of the examples B to F and the group of the examples G to J that the charge and discharge efficiency of the negative electrode exhibits a high value of 80% or more when any second solvent selected from the group of dimethyl carbonate, methyl ethyl carbonate, diethyl carbonate, methyl propyl carbonate and methyl butyl carbonate is used the second solvent and there can be obtained an especially high charge and discharge efficiency in comparison with the case where the other ethers or chain carbonate with a large molecule weight are used as the second solvent.

Further, when this EXAMPLE 6 is compared with the case of the foregoing EXAMPLE 4, it can be seen therefrom that the high charge/discharge characteristics can be obtained even when the charge/discharge operation is conducted with a current density as high as 10 times that in the case of the EXAMPLE 4, similarly to the case of the EXAMPLE 5 using the burned coke material as a negative active material, and therefore there can be obtained by mixing 4-trimethyl-ethylene carbonate and any kind of the solvents for lowering the viscosity, an organic electrolyte bringing about the negative electrode made of artificial black lead material which having a high charge/discharge efficiency and a high rate charge/discharge characteristics.

EXAMPLE 7

Using the three-polar beaker type cells same as in the foregoing EXAMPLE 3, the organic electrolytes of the examples K to R as shown in Table 14 below were poured therein.

Each cell was charged and discharged in such a manner that it was charged with a current density of 1.0 mA/cm$^2$ at a temperature of 25° C. to occlude lithium ions until the electric potential of the test negative electrode became 0 V to the reference electrode, and, after it was allowed to stand for 10 minutes, it was discharged with the same current density to release lithium ions until the electric potential of the test negative electrode became 1.5 V to the reference electrode.

TABLE 14

|  | Lithium salt | | Kind of solvent mixture | | |
|---|---|---|---|---|---|
|  | Kind of lithium salt | Concentration mol/L | First solvent | Second solvent | Mixing ratio (by volume) |
| Example K | LiPF$_6$ | 1.0 | 4TFMEC | DEC | 10:90 |
| Example L | LiPF$_6$ | 1.0 | 4TFMEC | DEC | 20:80 |
| Example M | LiPF$_6$ | 1.0 | 4TFMEC | DEC | 30:70 |
| Example N | LiPF$_6$ | 1.0 | 4TFMEC | DEC | 40:60 |
| Example O | LiPF$_6$ | 1.0 | 4TFMEC | DEC | 50:50 |
| Example P | LiPF$_6$ | 1.0 | 4TFMEC | DEC | 60:40 |
| Example Q | LiPF$_6$ | 1.0 | 4TFMEC | DEC | 70:30 |
| Example R | LiPF$_6$ | 1.0 | 4TFMEC | DEC | 80:20 |

In table 14 above, 4TFMEC stands for 4-trifluoromethyl-ethylene carbonate and DEC stands for diethyl carbonate.

Table 15 below shows the discharge capacity rate and the charge/discharge efficiency when using the examples K to R.

TABLE 15

|  | Discharge capacity rate (%) | Charge/discharge efficiency (%) |
|---|---|---|
| Example K | 48 | 73 |
| Example L | 73 | 78 |
| Example M | 89 | 83 |
| Example N | 98 | 84 |
| Example O | 100 | 87 |
| Example P | 92 | 89 |
| Example Q | 60 | 93 |
| Example R | 19 | 94 |

In Table 15 above, the discharge capacity rate was obtained by using the following equation:

$$\text{Discharge capacity rate (\%)} = \frac{\text{Discharge capacity of test electrode using electrode of each sample}}{\text{Discharge capacity of test electrode using electrode of the example } O} \times 100 \quad (1)$$

4-trifluoromethyl-ethylene carbonate used as the first solvent, and diethyl carbonate used as the second solvent were mixed in the different mixing ratios with each other for evaluating the charge and discharge characteristics thereof. As a result, there exhibited such a tendency that as the volume rate of 4-trifluoromethyl-ethylene carbonate was increased, the charge/discharge efficiency was increased. When the volume rate of 3-fluoro-4-fluoro-propylene carbonate accounted for 30% or more of the total volume of the whole solvents, there was obtained such a high charge/discharge efficiency that is well over 80%. As to the discharge capacity, as the volume rate of 3-fluoro-4-fluoro-propylene carbonate was increased, it was increased and, it tended to increase in the beginning, and thereafter when the volume of 4-trifluoromethyl-ethylene carbonate reached around 50% of the total volume of the whole solvents, it reached the maximum, and thereafter it tended to be declined. From these facts, it can be seen that if the volume of 4-trifluoromethyl-ethylene carbonate as the first solvent is 30% or more and the volume of the second solvent is 40% or more of the total volume of the whole solvents, the reactivity between the negative electrode made of burned coke material and the electrolyte can be especially lowered so that the high high-rate charge/discharge characteristics and excellent charge/discharge efficiency can also be obtained.

EXAMPLE 8

Using three-polar beaker type cells same as in the foregoing EXAMPLE 4, the organic electrolytes of the examples K to R as shown in Table 14 above were poured therein.

Each cell was charged and discharged in such a manner that it was charged with a current density of 1.0 mA/cm$^2$ at a temperature of 25° C. to occlude lithium ions until the electric potential of the test negative electrode became 0 V to the reference electrode, and, after it was allowed to stand for 10 minutes, it was discharged with the same current density to release lithium ions until the electric potential of the test negative electrode became 1.5 V to the reference electrode.

Table 16 below whose the discharge capacity rate and the charge and discharge efficiency of the cells using the examples K to R. The discharge capacity rate is obtained by using the equation (1) shown in the above.

TABLE 16

| | Discharge capacity rate (%) | Charge/discharge efficiency (%) |
|---|---|---|
| Example K | 36 | 52 |
| Example L | 55 | 73 |
| Example M | 86 | 80 |
| Example N | 96 | 81 |
| Example O | 100 | 83 |
| Example P | 87 | 85 |
| Example Q | 52 | 89 |
| Example R | 16 | 89 |

4-trifluoromethyl-ethylene carbonate used as the first solvent, and diethyl carbonate used as the second solvent were mixed in the different mixing ratios with each other for evaluating charge and discharge characteristics thereof. As a result, there exhibited such a tendency that as the volume of 4-trifluoromethyl-ethylene carbonate was increased, the charge/discharge efficiency was increased. When the volume of 4-trifluoromethyl-ethylene ethylene carbonate accounted for 30% or more of the total volume of the whole solvents, there was obtained such a high charge/discharge efficiency that is 80% or more. As to the discharge capacity, as the volume rate of 4-trifluoromethyl-ethylene carbonate was increased, it was also increased, and it tended to increase in the beginning, and thereafter when the volume of 3-fluoro-4-fluoro-propylene carbonate reached around 50% of the total volume of the whole solvents, it reached the maximum, and thereafter it tended to be declined. From these results, it can be seen that if the volume of 4-trifluoromethyl-ethylene carbonate as the first solvent is 30% or more and the volume of the second solvent is 40% or more of the total volume of the whole solvents, the reactivity between the negative electrode made of burned coke material and the electrolyte can be especially lowered, so that the high rate charge/discharge characteristics and excellent charge/discharge characteristics can also be obtained.

EXAMPLE 9

Using the three-polar beaker type cells same as in the foregoing EXAMPLE 1, the organic electrolytes of the examples S to Z and the examples a and b as shown in Table 17 below were poured therein. Using these cells, after the organic electrolytes of the example A, the conventional examples A and the comparative examples A to C as shown in the foregoing Table 8, are poured therein.

Each cell was charged and discharged in such a manner that it was charged with a current density of 1.0 mA/cm$^2$ at a temperature of 25° C. to occlude lithium ions until the electric potential of the test negative electrode became 0 V to the reference electrode, and, after it was allowed to stand for 10 minutes, it was discharged with the same current density to release lithium ions until the electric potential of the test negative electrode became 1.5 V to the reference electrode.

TABLE 17

| | Lithium salt | | Kind of solvent for electrolyte | |
|---|---|---|---|---|
| | Kind of lithium salt | Concentration mol/L | Solvent mixture for electrolyte | Mixing ratio (by volume) |
| Example S | LiPF$_6$ | 1.0 | 4TFMEC + EC + DEC | 45:10:45 |
| Example T | LiPF$_6$ | 1.0 | 4TFMEC + EC + DEC | 40:20:40 |
| Example U | LiPF$_6$ | 1.0 | 4TFMEC + EC + DEC | 40:10:50 |
| Example V | LiPF$_6$ | 1.0 | 4TFMEC + EC + DEC | 30:20:50 |
| Example W | LiPF$_6$ | 1.0 | 4TFMEC + EC + DEC | 30:30:40 |
| Example X | LiPF$_6$ | 1.0 | 4TFMEC + DEC + EBC | 45:45:10 |
| Example Y | LiPF$_6$ | 1.0 | 4TFMEC + DEC + EBC | 40:40:20 |
| Example Z | LiPF$_6$ | 1.0 | 4TFMEC + DEC + EBC | 40:50:10 |
| Example a | LiPF$_6$ | 1.0 | 4TFMEC + DEC + EBC | 30:50:20 |
| Example b | LiPF$_6$ | 1.0 | 4TFMEC + DEC + EBC | 30:40:30 |

In Table 17, 4TFMEC stands for 4-trifluoromethyl-ethylene carbonate, EC stands for ethylene carbonate and DEC stands for diethyl carbonate and EBC stands for ethyl butyl carbonate.

Table 18 below shows the charge and discharge efficiency for the cells of the examples S to Z and the examples a and b.

TABLE 18

| | Charge/discharge efficiency (%) |
|---|---|
| Example S | 85 |
| Example T | 85 |
| Example U | 87 |
| Example V | 85 |
| Example W | 79 |
| Example X | 86 |
| Example Y | 84 |
| Example Z | 85 |
| Example a | 82 |
| Example b | 76 |

As can be seen from the foregoing Tables 17 and 18, when the solvent mixture prepared by mixing 4-trifluoromethyl-ethylene carbonate as the primary solvent and diethyl carbonate selected from the group of the above-mentioned five specified second solvents, that is, dimethyl carbonate, methyl ethyl carbonate, diethyl carbonate, methyl propyl carbonate and methyl butyl carbonate as the second solvent is added with the other second solvents, that is, the additional second solvents, as long as the total volume of the first solvent and the specified second solvent accounts for 80% or more of the total volume of the whole solvents, there can be obtained such a high charge/discharge efficiency of the test electrode made of artificial black lead which is higher in the reaction with the electrolyte, that is as high as 80% or more, without being influenced by the presence of the additional secondary solvent added.

EXAMPLE 10

Using the three-polar beaker type cells same as in foregoing EXAMPLE 4, the organic electrolytes of the examples S to Z and the examples a to d as shown in Table 17 above were poured therein. Using these cells, after the organic electrolytes of the example A, the conventional examples A and the comparative examples A to C as shown in the foregoing Table 8, are poured therein.

Each cell was charged and discharged in such a manner that it was charged with a current density of 1.0mA/cm$^2$ at a temperature of 25° C. to occlude lithium ions until the electric potential of the test negative electrode became 0 V to the reference electrode, and, after it was allowed to stand for 10 minutes, it was discharged with the same current density to release lithium ions until the electric potential of the test negative electrode became 1.5 V to the reference electrode.

Table 19 below shows the charge/discharge efficiency of the cells using the examples S to Z and the examples a to d.

TABLE 19

|  | Charge/discharge efficiency (%) |
|---|---|
| Example S | 82 |
| Example T | 79 |
| Example U | 81 |
| Example V | 80 |
| Example W | 74 |
| Example X | 81 |
| Example Y | 78 |
| Example Z | 80 |
| Example a | 76 |
| Example b | 72 |

From the above, it can be seen that when the solvent mixture of 4-trifluoromethyl ethylene carbonate as the primary solvent and diethyl carbonate as specified second solvent is added with the additional second solvent, as long as the volume of the solvent mixture of the primary solvent and the specified second solvent is 80% or more of the total volume of the whole solvents, there can be obtained such a charge/discharge efficiency that is as high as 75% or more, without being influenced by the presence of the additional second solvent added, even when artificial black lead artificial black lead which is high in the reactivity with solvents for an electrolyte is used.

EXAMPLE 11

A negative electrode and a positive electrode are put opposite one to another through a separator and the resultant cell assembly is placed in a battery container and the electrolytes of the examples B and D and the conventional examples B and C as shown in Table 20 below, were poured in the respective battery containers.

TABLE 20

| Lithium salt | | Kind of solvent for electrolyte | | Burned coke material Charge/discharge efficiency (%) |
|---|---|---|---|---|
| Kind of lithium salt | Concentration mol/L | Solvent mixture | Mixing ratio (by volume) | |
| Example B | LiPF$_6$ | 1.0 | 4TFMEC + DMC | 50:50 | 91 |
| Example D | LiPF$_6$ | 1.0 | 4TFMEC + DEC | 50:50 | 87 |
| Conventional example B | LiPF$_6$ | 1.0 | PC + DMC | 50:50 | 69 |
| Conventional example C | LiPF$_6$ | 1.0 | PC + DEC | 50:50 | 67 |

More in detail, all of the foregoing coin type batteries were manufactured so that the ratio of capacity of the positive electrode and that of the negative electrode is 1 to 1, at the time of manufacturing thereof, and the other constructional components may have the same components, except for that each kind of the above-mentioned various electrolytes may be poured in every 30 coin type batteries. The results of discharge capacity rate thereof at the first cycle are shown in Table 21 below.

TABLE 21

|  | Discharge capacity rate (%) |
|---|---|
| Example B | 131.7 |
| Example D | 125.7 |
| Conventional Example B | 100.0 |
| Conventional Example C | 97.1 |

As can be seen from the foregoing Table 21, the batteries using the electrolytes of the examples according to this invention are superior to the ones using the conventional electrolytes in the discharge capacity efficiency. The reason why the discharge capacity at the first cycle is improved with the examples according to this invention is due to the fact that the reactivity between the burned coke material of the negative electrode and the electrolytes using the examples according to this invention are much lower those using the conventional electrodes of the conventional examples, resulting in the higher charge/discharge efficiency, and larger energy density.

EXAMPLE 12

A negative electrode and a positive electrode are put opposite one to another through a separator and the resultant cell assembly is placed in a battery container, and the electrolyte of the examples B and D and the conventional examples B to D as shown in Table 22 below, were poured in the respective cell containers.

TABLE 22

| | Lithium salt | | Kind of solvent for electrolyte | | Artificial black lead |
|---|---|---|---|---|---|
| | Kind of lithium salt | Concentration mol/L | Kind of solvent mixture | Mixing ratio (by volume) | Charge/discharge efficency (%) |
| Example B | LiPF$_6$ | 1.0 | 4TFMEC + DMC | 50:50 | 86 |
| Example D | LiPF$_6$ | 1.0 | 4TFMEC + DEC | 50:50 | 83 |
| Conventional Example B | LiPF$_6$ | 1.0 | PC + DMC | 50:50 | — |
| Conventional Example C | LiPF$_6$ | 1.0 | PC + DEC | 50:50 | — |
| Conventional Example D | LiPF$_6$ | 1.0 | EC + DEC | 50:50 | 62 |

More in detail, all of the foregoing coin type batteries were manufactured so that the ratio of capacity of the positive electrode and that of the negative electrode is 1 to 1, at the time of manufacturing thereof, and the other constructional components may have the same components, except for that each kind of the above-mentioned various electrolytes may be poured in every 30 coin type batteries.

Table 23 below shows the discharge capacity rate at the first cycle using each electrolyte.

TABLE 23

| | Discharge capacity rate (%) |
|---|---|
| Example B | 138.2 |
| Example D | 132.7 |
| Conventional Example B | — |
| Conventional Example C | — |
| Conventional Example D | 100.0 |

As shown in the above, in the batteries using the electrolytes of the conventional examples B and C wherein propylene carbonate is used as a solvent, almost all of the charged capacity of the positive electrode were spent for the reaction between the artificial black lead and the electrolyte, so that the capacity could not be effectively taken out, even when propylene carbonate having a high dielectric constant for an electrolyte as used. Thus, propylene carbonate can not be used when the carbon materials having higher degree of crystallization such as artificial black lead or the like are used for the negative electrode. In the prior art, ethylene carbonate had to be used because its reactivity with such carbon materials of higher degree of crystallization as artificial black lead is less than propylene carbonate. But, it has such problem that it is difficult in handling since its melting point is as high as 36.4° C. and is solid at room temperature. Whereas, the batteries B and D according to this invention using 4-trifluoromethyl-ethylene carbonate having a high dielectric constant for an electrolyte can be charged and discharged sufficiently, and there can be obtained such an improved charge and discharge character that the discharge capacity at the first or one cycle is superior to the battery the conventional examples B and C using the electrolyte including ethylene carbonate having a high dielectric constant, as a component for an electrolyte.

The reason for that is considered due to the fact that the battery of this kind using the electrolyte of the example of this invention has, similar to the case of use burned coke material as an active material, has less reactivity of the artificial black lead with the electrolyte and higher charge/discharge efficiency than the battery using the electrolyte of the conventional example. In addition, since 4-trifluoromethyl-ethylene carbonate is liquid at room temperature, the handling thereof becomes much easier than that of ethylene carbonate.

Accordingly, it can be seen from the above-mentioned results that the lithium secondary battery using carbon materials for active materials for a negative electrode and using electrode according to this invention, even when artificial black lead is used as an active material, has a larger energy density and a superior charge and discharge cycle characteristics than the battery using the conventional electrode, similar to the case where burned coke material is used as an active material In addition, this invention is more effective as the degree of crystallization of carbon material is higher.

As for the second solvent, dimethyl carbonate, methyl ethyl carbonate, diethyl carbonate, methyl propyl carbonate, methyl butyl carbonate, dimethoxyethane, tetrahydrofuran, ethyl butyl carbonate and dibutyl carbonate were used for example in the foregoing EXAMPLES 6 and 7. But, this invention is not limited to these solvents. Furthermore, a solvent mixture of 4-trifluoromethyl-ethylene carbonate and a single second solvent was used just for example, but, two kinds or more of the solvents can be used for mixing to obtain good results.

In the foregoing EXAMPLES 7 and 8, diethyl carbonate was used for the specified secondary solvent for example, the other specified second solvent such as dimethyl carbonate, methyl ethyl carbonate, methyl propyl carbonate, methyl propyl solvent can also be mixed with 4-trifluoromethyl-ethylene carbonate.

In the foregoing EXAMPLES 9 and 10, diethyl carbonate was used as the specified second solvent for example, but, the other specified second solvent such as dimethyl carbonate, methyl ethyl carbonate, methyl propyl carbonate or methyl butyl carbonate can be used to obtain the similar effects. Also, as specified second solvent, only a single solvent as the second solvent was mixed with 4-trifluoromethyl-ethylene carbonate for example, but two kinds or more thereof can also be mixed with 4-trifluoromethyl-ethylene carbonate.

In addition, diethyl carbonate or ethyl butyl carbonate was used as the additional second solvent for example, but, at least one kind of second solvents as listed above can be mixed as the additional second solvent.

In the foregoing EXAMPLES 11 and 12, dimethyl carbonate or diethyl carbonate was used as the specified second solvent, but, methyl ethyl carbonate, methyl propyl carbonate or methyl butyl carbonate can be used as the specified second solvent.

As the specified second solvent, only a single solvent was mixed with the first solvent, but, two or more of the specified second solvents can be mixed with the first solvent.

In addition, any other second solvent than the above-mentioned specified second solvents was not mixed, but, at least one kind of the other second solvents can be mixed as an additional second solvent.

In the foregoing EXAMPLES, LiCoO$_2$ was used as an active material for a positive electrode, but, among other materials capable of electro-chemically occluding and releasing lithium ions as enumerated above can be used and similar effects are obtained.

Throughout the foregoing EXAMPLES 3–12, LiPF$_6$ alone was used as a solute. But, other inorganic salts such as LiClO$_4$, LiBF$_4$, LiAsF$_6$, LiCl, LiBr and organic salts such as LIB(C$_6$H$_5$)$_4$, LiC(SO$_2$CF$_3$)$_3$, LiOSO$_2$CF$_3$ can be used and similar effects are obtained. Also the mixture of two kinds or more of the above salts mainly including LiPF$_6$ can be used.

As for carbon materials for a negative electrode, in the foregoing EXAMPLES, burned coke material and artificial black lead material were used, but natural black lead, burned ones of organic materials or graphitized ones thereof, etc. can be used. Also the mixture of two kinds or more of the carbon materials can be used and similar effects can be obtained.

As can be seen from the above EMBODIMENT 3 of this invention, when the lithium secondary battery comprises at least 4-trifluoromethyl-ethylene carbonate as the first solvent for an organic electrolyte and carbon material capable of electro-chemically occluding and releasing lithium ions as an active material for a negative electrode active material, it exhibits better battery performance than the conventional ones or other kind of fluorine substituted propylene carbonates. More in detail, 4-trifluoro-methyl-ethylene carbonate sufficiently suppresses the reaction between negative carbon material and the electrolyte and can improve the charge/discharge efficiency at the initial stage thereof, and as a result, it can provide the lithium battery with larger energy density. Also, if at least one kind of carbonates selected from the group of dimethyl carbonate, methyl ethyl carbonate, diethyl carbonate, methyl propyl carbonate and methyl butyl carbonate is mixed, it can provide the lithium secondary battery with excellent high rate charge/discharge characteristics in addition to other characteristics as mentioned above. In the mixture of 4-trifluoromethyl-ethylene carbonate and at least one kind of the specified second solvents, the lithium secondary battery having, at a very high level, abovementioned characteristics can be provided by defining the mixing ratio thereof.

Also the handling of 4-trifluoromethyl ethylene carbonate is easier than that of ethylene carbonate due to its liquid phase at ambient temperature. Therefore, it is very beneficial in the industrial use thereof.

EMBODIMENT 4

Next, a preferred embodiment of this invention will be described below for providing a lithium secondary battery having the positive electrolyte comprising at least one kind of lithium containing complex oxides having the α-NaCrO$_2$ structure which is excellent especially in suppressing the deterioration of the characteristics of the positive active material and is improved in the energy density.

Namely, more in detail, in the lithium secondary battery comprising a negative electrode made of at least one kind of carbon materials capable of electro-chemically occluding and releasing ions such as metallic lithium, lithium alloys, etc., a positive electrode made of at least one kind of lithium containing complex oxides having the α-NACrO$_2$ structure and an electrolyte comprising a solute and a solvent, according to this invention, it is characterized in that the solvent for the electrolyte comprising at least 4-trifluoromethyl-ethylene carbonate as a first solvent.

When any kind of fluorine substituted propylene carbonates is used as a solvent, there is brought about such effects that the deterioration of the characteristics of the active material for the positive electrolyte of this kind at the large depth of charging and the discharge capacity is increased. However, it has been found out that above all, since 4-trifluoromethyl-ethylene carbonate has fluorine substituted methyl group, that part becomes an electron attractive property, so that it is considered that the effect of suppression of the deterioration of the characteristics thereof at the time of charge and discharge cycles is superior and also the battery performance become especially superior to the solvents using other propylene carbonates each of which three hydrogen atoms of the methyl group are not substituted with three fluorine atoms at all. It is preferable that it is mixed with any kind of solvents for lowering viscosity of 4-trifluoromethyl-ethylene carbonate, as a second solvent to make the resultant solvent mixture which is lowered in viscosity and brings about the improvement of the high rate discharge characteristics.

Especially, when at least one kind selected from the group of dimethyl carbonate, methyl ethyl carbonate, diethyl carbonate, methyl propyl carbonate, methyl propyl carbonate and methyl butyl carbonate is used as the second solvent, there can be obtained the solvent mixture which brings about less deterioration of the positive active material at the large depth of charging high-rate discharge characteristics.

In this case, when the solvent mixture thereof is used, a good charge/discharge characteristics can be obtained when the mixing ratio thereof meets such conditions that the volume rate of the primary solvent comprising at least 4-trifluoromethyl-ethylene-carbonate is 30% or more of the total volume of the whole solvents for an organic electrolyte, that the volume rate of the second solvent comprising at least one kind selected from the group of dimethyl carbonate, methyl ethyl carbonate, diethyl carbonate, methyl propyl carbonate, diethyl carbonate, methyl propyl carbonate and methyl butyl carbonate is 40% or more of the total volume thereof, and that second solvent is 80% or more of the total volume thereof.

For the other solvents, any kind thereof may be mixed with 4-trifluoromethyl-ethylene carbonate. Them are such solvents having a high dielectric constant solvent such as propylene carbonate, ethylene carbonate, butylene carbonate, γ-butylolactone, vinylene carbonate, 2-methyl-γ-butylo lactone, acetyl-γ-butylolactone, γ-valero-lactone, etc. Among them, it is preferable to use ethylene carbonate or propylene carbonate alone or in the mixture thereof since they are electro-chemically stable. Now, the detailed examples of this invention will be described below.

EXAMPLE 13

A test positive electrode using LiCoO$_2$ powder used as an active material was produced in such a manner as in the foregoing EXAMPLE 1. Using a counter electrode and a reference electrode which are made of matallic lithium, three polar beaker type cells were prepared by combining the above test electrodes therewith. The electrolytes corresponding to the examples A to C and the conventional example A and the comparative examples A to C as shown in Table 24 below were poured in the respective cells.

TABLE 24

| | Lithium salt | | |
|---|---|---|---|
| | Kind of lithium salt | Concentration mol/L | Kind of solvent for electrolyte |
| Example A | LiPF$_6$ | 1.0 | 4TFMEC |
| Conventional Example A | LiPF$_6$ | 1.0 | PC |
| Comparative Example A | LiPF$_6$ | 1.0 | 3F4FPC |
| Comparative Example B | LiPF$_6$ | 1.0 | 3FPC |
| Comparative Example C | LiPF$_6$ | 1.0 | 4FPC |

In Table 24 above, 4TFMEC stands for 4-trifluoromethyl ethylene carbonate, PC stands for propylene carbonate, 3F4FPC stands for 3-fluoro-4-fluoro propylene carbonate, 3FPC stands for 3-fluoro-propylene carbonate, 4FPC stands for 3-fluoro propylene carbonate.

Each of these cells was charged with a current density of 0.1 mA/cm$^2$ at a temperature of 25° C. until the electric potential of the test electrode became 1.5 V to the reference electrode, and after standing for 10 minutes, is was discharged with the same density until the electric potential thereof became 0 V to the reference electrode.

Table 25 below shows the discharge capacity retention rate at the 50th cycle for the cells using the example A and the conventional example A and the comparative examples A to C.

TABLE 25

| | Discharge capacity retention rate at the 50th cycle (%) |
|---|---|
| Example A | 86 |
| Conventional Example A | 27 |
| Comparative Example A | 83 |
| Comparative Example B | 78 |
| Comparative Example C | 76 |

As can be seen from the Table 24 and 25, as to the discharge capacity retention rate at the 50th cycle, the cell using the example A is much higher than the cells using the conventional example A.

It can be seen therefrom that use of the electrolyte according to this invention brings about the effect to suppress the deterioration of the characteristics of the test positive electrode comprising a lithium containing complex oxide having the α-NaCrO$_2$ structure at the large or deep depth of charging, and the deterioration of the characteristics is much less even by charging at the large depth of charging than the use of the conventional electrolyte.

Also, from the comparison between the example and the comparative examples, it can be seen that this invention electrolyte brings about superior charge/discharge characteristics to the comparative examples. This superiority is considered to be owing to the fact that 4-trifluoromethyl-ethylene carbonate is more electro-chemically stable than the other kinds of fluorine substituted propylene carbonates.

EXAMPLE 14

Using the same three polar beaker type cells same as ones used in the foregoing EXAMPLE 13, the organic electrolytes of the examples D to L and the conventional examples B and C as shown in Table 26 below were poured in these cells. Each of these cells thus produced was charged with a current density of 1.0 mA/cm$^2$ at a temperature of 25° C. until the electric potential of the test electrodes became 4.5 V to the reference electrode and after standing for 10 minutes, it was discharge with the same current density until the electric potential thereof became 2.75 V to the reference electrode.

TABLE 26

| | Lithium salt | | Kind of solvent for electrolyte | |
|---|---|---|---|---|
| | Kind of lithium salt | Concentration mol/L | Solvent mixture | Mixing ratio (by volume) |
| Example B | LiPF$_6$ | 1.0 | 4TFMEC + DMC | 50:50 |
| Example C | LiPF$_6$ | 1.0 | 4TFMEC + MEC | 50:50 |
| Example D | LiPF$_6$ | 1.0 | 4TFMEC + DEC | 50:50 |
| Example E | LiPF$_6$ | 1.0 | 4TFMEC + MPC | 50:50 |
| Example F | LiPF$_6$ | 1.0 | 4TFMEC + MBC | 50:50 |
| Example G | LiPF$_6$ | 1.0 | 4TFMEC + DMC | 50:50 |
| Example H | LiPF$_6$ | 1.0 | 4TFMEC + THF | 50:50 |
| Example I | LiPF$_6$ | 1.0 | 4TFMEC + EBC | 50:50 |
| Example J | LiPF$_6$ | 1.0 | 4TFMEC + DBC | 50:50 |
| Conventional Example B | LiPF$_6$ | 1.0 | PC + DMC | 50:50 |
| Conventional Example C | LiPF$_6$ | 1.0 | PC + DEC | 50:50 |

In Table 26 above, 4TFMEC stands for 4-trifluoromethyl-ethylene carbonate, PC stands for propylene carbonate, DMC stands for dimethyl carbonate, MBC stands for methyl butyl carbonate, MEC stands for methyl ethyl carbonate, DEC stands for diethyl carbonate, MPC stands for methyl ethyl carbonate, DME stands for dimethoxy ethane, THF stands for tetrahydrofuran, EFB stands for ethyl butyl carbonate, DBC stands for dibutyl carbonate.

Table 27 below shows the discharge capacity retention rate at the 50th cycle for the examples B to J and the conventional examples B and C.

TABLE 27

| | Discharge capacity retention rate at the 50th cycle (%) |
|---|---|
| Example B | 85 |
| Example C | 84 |
| Example D | 79 |
| Example E | 79 |
| Example F | 75 |
| Example G | 67 |
| Example H | 63 |
| Example I | 70 |
| Example J | 66 |
| Conventional Example B | 38 |
| Conventional Example C | 30 |

As can be seen from the Table 27, the discharge capacity retention rates at the 50th cycle obtained with the electrolytes of the examples B to J are much higher than those with the electrolytes of the conventional examples B and C.

It can be seen from the above results that even when 4-trifluoromethyl-ethylene carbonate is used to be mixed with various kinds of solvents for lowering the viscosity thereof, there can be brought about the effect of suppressing the deterioration of the characteristics of the active material for the test electrode comprising lithium containing complex oxide having the α-NaCrO$_2$ structure when the large depth of charging was carried out, as compared with the use of the conventional type electrolyte, so that the deterioration of the characteristics thereof becomes smaller even when the charging was carried out as far as the deep depth as compared with use of the conventional electrolytes.

Also it can be seen from the comparison between the group of the examples D to F and the group of the examples G to L that the discharge capacity retention rate at the 50th cycle for the test electrode exceeds 75% when using the specified second solvent selected from the group of dimethyl carbonate, methyl ethyl carbonate, diethyl carbonate, methyl propyl carbonate and methyl butyl carbonate as compared with using the other low viscous solvents comprising other esters or others having longer molecular weights, and these specified second solvents are largely effective to protect the negative active material from deterioration at the large depth of charging.

Further, from comparison of this Example with the foregoing EXAMPLE 30, it can be seen that there can be obtained an excellent high battery characteristics even when charging and discharging with such a high current density that is 10 times that in the case of the foregoing EXAMPLE 14, by mixing 4-trifluoromethyl-ethylene carbonate with the second solvents.

EXAMPLE 15

Using the three-poler beaker type cells same as ones used in the foregoing EXAMPLE 13, the organic electrolytes of the examples K to R shown in Table 28 below were poured therein.

Each of the cells was charged with a current density of 1.0 mA/cm² at a temperature of 25° C. until the electric potential of the test electrode became 4.5 V to the reference electrode, and after standing for 10 minutes, it was discharged with the same current density until the electric potential became 2.75 V to the reference electrode.

TABLE 28

| | Lithium salt | | Kind of solvent for electrolyte | |
|---|---|---|---|---|
| | Kind of lithium salt | Concentration mol/L | Kind of solvent mixture | Mixing ratio (by volume) |
| Example K | LiPF$_6$ | 1.0 | 4TFMEC + DEC | 10:90 |
| Example L | LiPF$_6$ | 1.0 | 4TFMEC + DEC | 20:80 |
| Example M | LiPF$_6$ | 1.0 | 4TFMEC + DEC | 30:70 |
| Example N | LiPF$_6$ | 1.0 | 4TFMEC + DEC | 40:60 |
| Example O | LiPF$_6$ | 1.0 | 4TFMEC + DEC | 50:50 |
| Example P | LiPF$_6$ | 1.0 | 4TFMEC + DEC | 60:40 |
| Example Q | LiPF$_6$ | 1.0 | 4TFMEC + DEC | 70:30 |
| Example R | LiPF$_6$ | 1.0 | 4TFMEC + DEC | 80:20 |

In Table 28, 4TFMEC stands for 4-trifluoromethyl-ethylene carbonate and DEC stands for diethyl carbonate.

Table 29 below shows the discharge capacity rates at the 10th. at which the charging and discharging reaction is stabilized and at the 50th cycle, respectively for the cells using the examples K to R.

TABLE 29

| | Discharge capacity rate at the 10th cycle (%) | Discharge capacity retention rate at the 50th cycle (%) |
|---|---|---|
| Example K | 33 | 43 |
| Example L | 54 | 59 |
| Example M | 86 | 75 |
| Example N | 98 | 79 |
| Example O | 100 | 79 |
| Example P | 80 | 80 |

TABLE 29-continued

| | Discharge capacity rate at the 10th cycle (%) | Discharge capacity retention rate at the 50th cycle (%) |
|---|---|---|
| Example Q | 41 | 82 |
| Example R | 14 | 83 |

In Table 29, the respective discharge capacity retention rates are obtained by the following equation (2)

$$\text{Discharge capacity rate at the 10th cycle (\%)} = \frac{\text{Discharge capacity of test electrode using electrolyte of each example at the 10th cycle}}{\text{Discharge capacity of test electrode using electrolyte of example } O \text{ at the 10th cycle}} \times 100 \quad (2)$$

When the charge/discharge characteristics is evaluated in the case of varying the mixing ratio of 4-trifluoromethyl-ethylene carbonate as the first solvent and diethyl carbonate as the second solvent, it can be seen that with the increase of the volume rate of 4-trifluoromethyl-ethylene carbonate, the discharge capacity retention rate at the 50th cycle tends to be increased and when 4-trifluoromethyl-ethylene carbonate is 30% or more of the total volume of the whole solvents, there can be obtained such a high discharge capacity retention rate that largely exceeds 80%, and in addition, with the increase of the volume rate of 4-trifluoromethyl-ethylene carbonate, the discharge capacity at the 10th cycle tends to be increased in the beginning, and thereafter it becomes the maximum when the volume rate of 4-trifluoromethyl-ethylene carbonate is about 50%, and thereafter it tends to be decreased, and when the volume rate of 4-trifluoromethyl-ethylene carbonate is in the range of 30% to 60% of total volume of the whole solvents for the electrolyte, there can be obtained such a high discharge capacity rate that is 80% or more from the results, it can be understood that when volume rate of 4-trifluoromethyl-ethylene carbonate is 30% or more of the total volume of the whole solvents and the volume rate of the secondary solvent is 40% or more of the total volume thereof, there can be obtained especially large effect to suppress the deterioration of the characteristics of the active materials for the test electrode comprising lithium containing complex oxides having the α-NaCrO$_2$ structure at the large depth of charging, and especially excellent battery characteristics and the high rate charge/discharge efficiency can be obtained.

EXAMPLE 16

Using the three-polar beaker type cells same as ones used in the foregoing EXAMPLE 13, the organic electrolytes of the examples S to Z and the examples a and b as shown in Table 30 below were poured therein.

Each of the cells was charged with a current density of 1.0 mA/cm² at a temperature of 25° C. until the electric potential of the test electrode became 4.5 V to the reference electrode, and after standing for 10 minutes, it was discharged with the same current density until the electric potential thereof became 2.75 V to the reference electrode.

TABLE 30

| | Lithium salt | | Kind of solvent for electrolyte | |
|---|---|---|---|---|
| | Kind of lithium salt | Concentration mol/L | Kind of solvent mixture | Mixing ratio (by volume) |
| Example S | LiPF$_6$ | 1.0 | 4TFMEC + EC + DEC | 45:10:45 |
| Example T | LiPF$_6$ | 1.0 | 4TFMEC + EC + DEC | 40:20:40 |
| Example U | LiPF$_6$ | 1.0 | 4TFMEC + EC + DEC | 40:10:50 |
| Example V | LiPF$_6$ | 1.0 | 4TFMEC + EC + DEC | 30:20:50 |
| Example W | LiPF$_6$ | 1.0 | 4TFMEC + EC + DEC | 30:30:40 |
| Example X | LiPF$_6$ | 1.0 | 4TFMEC + DEC + EBC | 45:45:10 |
| Example Y | LiPF$_6$ | 1.0 | 4TFMEC + DEC + EBC | 40:40:20 |
| Example Z | LiPF$_6$ | 1.0 | 4TFMEC + DEC + EBC | 40:50:10 |
| Example a | LiPF$_6$ | 1.0 | 4TFMEC + DEC + EBC | 30:50:20 |
| Example b | LiPF$_6$ | 1.0 | 4TFMEC + DEC + EBC | 30:40:30 |

In Table 30 below, 4TFMEC stands for 4-trifluoromethyl-ethylene-carbonate, EC stands for ethylene carbonate and DEC stands for diethyl carbonate and EBC stands for ethyl butyl carbonate.

The Table 31 below shows the discharge capacity retention rate at the 50th cycle for the examples S to Z and the examples a and b.

TABLE 31

| | Discharge capacity retention rate at the 50th cycle (%) |
|---|---|
| Example S | 75 |
| Example T | 73 |
| Example U | 77 |
| Example V | 72 |
| Example W | 69 |
| Example X | 74 |
| Example Y | 71 |
| Example Z | 74 |
| Example a | 72 |
| Example b | 64 |

As can be seen from the above Tables 30 and 31, when the solvent mixture of 4-trifluoromethyl-ethylene carbonate used as the first solvent and diethyl carbonate used as the second solvent is added with the additional second solvents, only if the total volume of the first solvent and specified second solvent is 80% or more of the total volume of the whole solvents for an organic electrolyte, there can be obtained such a high value of the discharge capacity retention rate at the 50th cycle for the test electrode that largely exceeds 70% without being influenced by the presence of the additional solvents added.

EXAMPLE 17

A negative electrode and a positive electrode are put opposite one to another through a separator and the resultant cell assembly is placed in a battery container, and the electrolytes of the examples B and D and the conventional examples B and C as shown in Table 32 below, were poured in the respective battery containers. Thus, 30 coin type batteries were produced for every kind of these electrolytes.

TABLE 32

| | Lithium salt | | Kind of solvent for electrolyte | |
|---|---|---|---|---|
| | Kind of lithium salt | Concentration mol/L | Kind of solvent mixture | Mixing ratio (by volume) |
| Example B | LiPF$_6$ | 1.0 | 4TFMC + DMC | 50:50 |
| Example D | LiPF$_6$ | 1.0 | 4TFMC + DMC | 50:50 |
| Conventional Example B | LiPF$_6$ | 1.0 | PC + DMC | 50:50 |
| Conventional Example C | LiPF$_6$ | 1.0 | PC + DEC | 50:50 |

The positive electrode, the negative electrode and the separator were used the same as those in the foregoing EXAMPLE 14.

Each of the batteries thus produced was charged with a current value of 0.2 CmA at a temperature of 25° until the battery voltage became 4.5 V, and after standing for 10 minutes, it was discharged with the same current value until the battery voltage became 2.75 V, and each battery was measured by using the charge and discharge measuring apparatus for comparison of the discharge capacity rate at the 400 cycle.

Table 33 below shows the discharge capacity retention rates at 400th cycle for the batteries using the above-mentioned electrolytes. Each value obtained is the average of 30 batteries for each electrolyte.

TABLE 33

| | Discharge capacity rate at the 400th cycle (%) |
|---|---|
| Example B | 293 |
| Example D | 272 |
| Conventional Example B | 100 |
| Conventional Example C | 66 |

In Table 33 above, the discharge capacity rate is obtained by the following equation (3):

$$\text{Discharge capacity rate at the 400th cycle (\%)} = \frac{\text{Discharge capacity of test electrode using electrolyte of each example at the 400th cycle}}{\text{Discharge capacity of test electrode using electrolyte of example } B \text{ at the 400th cycle}} \times 100 \quad (3)$$

Thus, it can be seen therefrom that the discharge capacity rate at the 400th cycle for the batteries using the electrolytes of the examples according to this invention are much larger than that of the batteries using the electrolytes of the conventional examples. The reason why the discharge capacity rate at the 400th cycle is improved as such is due to the fact that the electrolytes according to this invention bring about the effect of suppressing the deterioration of the characteristics of the positive active material comprising the lithium containing complex oxide having $\alpha$-NaCrO$_2$ structure at the large depth of charging as compared with the conventional electrolytes. Accordingly, it can be understood that, with the lithium secondary battery using the positive active material of this kind, the charge/discharge cycle characteristics is sufficiently superior even the charge/discharge cycles at the large or deep depth of charging as compared with the conventional batteries using the conventional electrolytes, so that larger discharge capacity can be taken out at each cycle, and consequently the lithium secondary battery has the larger energy density larger than that of the conventional batteries using the conventional electrolytes.

In the foregoing EXAMPLE 14, as for second solvents, dimethyl carbonate, methyl ethyl carbonates, diethyl carbonate, methyl propyl carbonate, methyl butyl carbonate and dibutyl carbonate were used for example, but, this invention is not limited to these solvents, and any other kind of solvents as enumerated in the above can be used. Furthermore, a single of the solvent was mixed with 4-trifluoromethyl-propylene carbonate for example, but, two kinds or more of the solvents can be used for mixing.

In the foregoing EXAMPLE 15, diethyl carbonate was used for the specified second solvent for example, but the other specified second solvent such as dimethyl carbonate, methyl ethyl carbonate, methyl propyl carbonate, methyl propyl carbonate and methyl butyl carbonate can be used and similar effects can be obtained.

In this case, a single specified second solvent was mixed with 4-trifluoromethyl-ethylene carbonate for example, but two kind or more of the specified second solvents can also be mixed with 4-trifluoromethyl-ethylene carbonate to obtain the similar results.

In the foregoing EXAMPLE 16, diethyl carbonate was used as the specified secondary solvent for example, but, any other specified secondary solvent such as dimethyl carbonate, methyl ethyl carbonate, methyl propyl carbonate, methyl propyl carbonate and methyl butyl carbonate can be used to obtain similar results.

Furthermore, a single solvent was mixed with 4-trifluoromethyl-ethylene carbonate for example, but, two kinds or more of the specified second solvent can also be mixed with 4-trifluoromethyl-ethylene carbonate.

In addition, ethylene carbonate or ethyl butyl carbonate was used as the additional second solvent for example, but, one or more than two other second solvents as listed above can be mixed with the mixture of the first solvent and the specified second solvent.

In the foregoing EXAMPLE 17, dimethyl carbonate or diethyl carbonate were used as the specified second solvent for example, but, the other second solvent such as methyl ethyl carbonate, methyl propyl carbonate and methyl butyl carbonate can be used to obtain similar results.

Furthermore, the specified second solvent was singly mixed with 4-trifluoromethyl-ethylene carbonate for example, but, two kinds or more of the specified second solvents can be mixed with 4-trifluoromethyl-ethylene carbonate.

Furthermore, the solvent mixture of the first solvent and the specified second solvent was used for example, but, at least one kind of the additional second solvents as enumerated above can be added to the mixture.

Throughout the foregoing EXAMPLE 13 to 17, $LiCoO_2$ was used as an active material for a positive electrode, but, any other kind of lithium containing complex oxides having the $\alpha$-$NaCrO_2$ structure such as $LiNiO_2$, $LiMnO_2$, etc. can be used and similar effects can be obtained.

Furthermore $LiPF_6$ alone was used as a solute, but other inorganic lithium salts such as $LiClO_4$, $LiBF_4$, $LiAsF_6$, $LiCl$ $LiBr$, etc. or organic lithium salts such as $LiB(C_6H_5)_4$, $LiC(SO_2CF_3)$, $LiOSO_2CF_3$, etc. can be selectively used to obtain similar results. In this case, the mixture of two kinds or more of the above lithium salts or the mixture including or not including $LiPF_6$ can be used to obtain similar effects.

Thus, according to the above EMBODIMENT 4 of this invention, when the organic electrolyte comprising lithium salt as a solute and 4-trifluoromethyl-ethylene carbonate as a first solvent is used as an electrolyte for a lithium secondary battery using as an active material for a positive electrode comprising at least one pound of lithium containing complex oxide having the $\alpha$-$NaCrO_2$ structure, it is more effective in suppressing the deterioration of the characteristics of the positive active material at the deep or large depth of charging, and there can be provided a lithium secondary battery having a large energy density, as compared with the conventional electrolytes and also with other kinds of fluorine substituted propylene carbonates.

In addition, when a solvent mixture of 4-trifluoromethyl-ethylene carbonate as the first solvent and at least one kind selected from the group of dimethyl carbonate, methyl ethyl carbonate, diethyl carbonate, methyl propyl carbonate and methyl butyl carbonate as the second solvent for decreasing the viscosity of the first solvent is used as the electrolyte, there can be provided a lithium secondary battery which has the effect of improving especially the high rate charge/discharge characteristics, in addition to the above-mentioned mentioned excellent suppressing effect.

In the case of using the solvent mixture of the foregoing first solvent and second solvent, if the mixture ratio thereof is so defined as mentioned above, there can be provided a lithium secondary battery which has the above-mentioned two effects, at a high level, and thus this invention is high in utility value in its industrial application.

What is claimed is:

1. A lithium secondary battery comprising a negative electrode made of at least one kind of active materials selected from the group consisting of metallic lithium, lithium alloys and a carbon material capable of electrochemically occluding and releasing lithium ions, a positive electrode made of at least one kind of materials capable of electro-chemically occluding and releasing lithium ions and an organic electrolyte prepared by dissolving a solute comprising at least one kind of lithium salts in a mixture solvent containing at least one kind of cyclic esters used as a first solvent and at least one kind of chain esters used as a second solvent, the improvement being that the first solvent comprises at least 4-trifluoromethyl-ethylene carbonate.

2. A lithium secondary battery according to claim 1, wherein the second solvent comprises at least dimethyl carbonate.

3. A lithium secondary battery according to claim 2, wherein the volume of the first solvent comprising at least 4-trifluoromethyl-ethylene carbonate is 35%–55% of the total volume of the whole solvents for the organic electrolyte and the second solvent is 45 to 65 of the total volume thereof and the volume of dimethyl carbonate as the second solvent is 40 to 100% of the total volume of the second solvent.

4. A lithium secondary battery according to claim 2, wherein the first solvent contains at least 4-trifluoromethyl-ethylene carbonate and the second solvent comprises at least a solvent mixture prepared by mixing dimethyl carbonate and at least one kind selected from the group consisting of diethyl carbonate and methyl ethyl carbonate, and the volume of the first solvent is 35–55% of the total volume of the whole solvents for the organic electrolyte and the second solvent is 45 to 65% of the total volume of the second solvent.

5. A lithium secondary battery according to claim 1, wherein the negative electrode is made of at least one kind of carbon materials capable of electro-chemically occluding and releasing lithium ions and the first solvent comprises 4-trifluoromethyl-ethylene carbonate.

6. A lithium secondary battery according to claim 4, wherein the organic solvent for the organic electrolyte comprises 4-trifluoromethyl ethylene carbonate used as the first solvent and at least one kind selected from the group consisting of dimethyl carbonate, methyl ethyl carbonate, diethyl carbonate, methyl propyl carbonate and methyl buthyl carbonate used as the second solvent.

7. A lithium secondary battery according to any one of claims 5 and 6, wherein the volume of the first solvent is 30% or more of the total volume of the whole solvents for the organic electrolyte, the volume of the second solvent is 40% or more of the total volume thereof and the total volume of the solvent mixture of the first solvent and the second solvent is 80 or more of the total volume thereof.

8. A lithium secondary battery according to claim 1, wherein the positive electrode is made of at least one kind of lithium containing complex oxides having an $\alpha$-$NaCrO_2$ structure, and the organic solvent for the organic electrolyte comprises at least a solvent mixture consisting of 4-trifluoromethyl-ethylene carbonate and the second solvent for lowering the viscosity of the first solvent.

9. A lithium secondary battery according to claim 8, wherein the organic solvent for the organic electrolyte comprises a solvent mixture of 4-trifluoromethyl-ethylene carbonate and at least one kind selected from the group consisting of dimethyl carbonate, methyl ethyl carbonate, diethyl carbonate, methyl propyl carbonate and methyl butyl carbonate used as the second solvent.

10. A lithium secondary battery according to any one of claims 8 and 9, wherein the volume of the first solvent is 30% or more of the total volume of the whole solvents for the organic electrolyte, and the second solvent is 40% or more or the total volume thereof and the volume of the solvent mixture is 80% or more of the total volume thereof.

* * * * *